(12) United States Patent
Szajewski et al.

(10) Patent No.: US 7,310,477 B2
(45) Date of Patent: Dec. 18, 2007

(54) PHOTOGRAPHIC FILM CARTRIDGE OR CASSETTE SYSTEMS WITH MICROLENS

(75) Inventors: Richard P. Szajewski, Rochester, NY (US); Lyn M. Irving, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 756 days.

(21) Appl. No.: 10/649,464

(22) Filed: Aug. 26, 2003

(65) Prior Publication Data

US 2005/0046734 A1    Mar. 3, 2005

(51) Int. Cl.
G03B 17/26    (2006.01)
G03B 41/00    (2006.01)

(52) U.S. Cl. ...................................... 396/322; 396/512
(58) Field of Classification Search ................ 396/306, 396/307, 322, 332, 333, 511, 512
See application file for complete search history.

(56) References Cited

U.S. PATENT DOCUMENTS

| | | |
|---|---|---|
| 992,151 A | 5/1911 | Berthon |
| 1,746,584 A | 2/1930 | Fournier |
| 1,749,278 A | 3/1930 | Fredrick |
| 1,824,353 A | 9/1931 | Jensen |
| 1,838,173 A | 12/1931 | Chretien |
| 1,849,036 A | 3/1932 | Ernst |
| 1,942,841 A | 1/1934 | Shimizu |
| 1,985,731 A | 12/1934 | Ives |
| 2,143,762 A | 1/1939 | Eggert et al. |
| 2,144,649 A | 1/1939 | Eggert et al. |
| 2,191,038 A | 2/1940 | Capstaff |
| 2,252,006 A | 8/1941 | Holst et al. |
| 2,304,988 A | 12/1942 | Yule |
| 2,316,644 A | 4/1943 | Yule |
| 2,407,211 A | 9/1946 | Yule |
| 2,455,849 A | 12/1948 | Yule |
| 2,691,586 A | 10/1954 | Yule et al. |
| 2,992,103 A | 7/1961 | Land et al. |
| 3,413,117 A | 11/1968 | Gaynor |
| 3,506,350 A | 4/1970 | Denner |
| 3,905,701 A | 9/1975 | David |
| 3,954,334 A | 5/1976 | Bestenreiner et al. |
| 3,971,065 A | 7/1976 | Bayer |

(Continued)

FOREIGN PATENT DOCUMENTS

JP    06044265    7/1992

(Continued)

OTHER PUBLICATIONS

Edward M. Crane and C. H. Evans, "Devices for Making Sensitometric Exposures on Embossed Kinescope Recording Film" Jan. 1958, pps. 13-16, Journals of the SMPTE vol. 67.

(Continued)

Primary Examiner—W. B. Perkey

(57) ABSTRACT

Cartridge and camera systems are provided that have a cartridge with a photosensitive element having an exposure surface and a housing having a storage area for storing the photosensitive element and an opening adapted to permit transport of the photosensitive element from a storage position within a housing to exposure position outside of the housing. A micro-lens array is joined the housing and positioned to confront the exposure surface when the photosensitive element is in the exposure position.

27 Claims, 17 Drawing Sheets

U.S. PATENT DOCUMENTS

| | | | |
|---|---|---|---|
| 3,973,953 A | 8/1976 | Montgomery | |
| 3,973,954 A | 8/1976 | Bean | |
| 3,973,957 A | 8/1976 | Montgomery | |
| 3,973,958 A | 8/1976 | Bean | |
| 4,040,830 A | 8/1977 | Rogers | |
| 4,272,186 A | 6/1981 | Plummer | |
| 4,458,002 A | 7/1984 | Janssens et al. | |
| 4,483,916 A | 11/1984 | Thiers | |
| 4,642,678 A | 2/1987 | Cok | |
| 4,667,092 A | 5/1987 | Ishihara | |
| 5,016,107 A | 5/1991 | Sasson et al. | |
| 5,034,760 A * | 7/1991 | Khait | 396/316 |
| 5,164,831 A | 11/1992 | Kuchta et al. | |
| 5,373,322 A | 12/1994 | Laroche et al. | |
| 5,440,369 A | 8/1995 | Tabata et al. | |
| 5,464,128 A | 11/1995 | Keller | |
| 5,477,291 A | 12/1995 | Mikami et al. | |
| 5,649,250 A | 7/1997 | Sasaki | |
| 5,668,597 A | 9/1997 | Parulski et al. | |
| 5,715,483 A | 2/1998 | Omata et al. | |
| 5,731,899 A | 3/1998 | Meyers | |
| 5,744,291 A | 4/1998 | Ip | |
| 5,751,492 A | 5/1998 | Meyers | |
| 5,757,021 A | 5/1998 | Dewaele | |
| 5,796,522 A | 8/1998 | Meyers | |
| 5,812,322 A | 9/1998 | Meyers | |
| 5,822,125 A | 10/1998 | Meyers | |
| 5,841,126 A | 11/1998 | Fossum et al. | |
| 5,874,994 A | 2/1999 | Xie et al. | |
| 5,877,809 A | 3/1999 | Omata et al. | |
| 5,965,875 A | 10/1999 | Merrill | |
| 6,067,114 A | 5/2000 | Omata et al. | |
| 6,137,535 A | 10/2000 | Meyers | |
| 6,141,048 A | 10/2000 | Meyers | |
| 6,381,072 B1 | 4/2002 | Burger | |
| 6,640,057 B1 * | 10/2003 | Szajewski et al. | 396/322 |
| 6,868,231 B2 * | 3/2005 | Irving et al. | 396/322 |
| 6,950,608 B2 * | 9/2005 | Szajewski et al. | 396/335 |
| 2006/0197014 A1 * | 9/2006 | Inuiya | 250/239 |

FOREIGN PATENT DOCUMENTS

| | | |
|---|---|---|
| JP | 10142685 | 11/1996 |
| JP | 11231372 | 2/1998 |
| JP | 2001-147466 | 5/2001 |

OTHER PUBLICATIONS

J.S. Courtney-Pratt, "Lenticular Plate Multiple Picture Shadowgraph Recording", Sep. 1961, pp. 710-715,, Journal of the SMPTE, vol. 70.

C.H.Evans and R.B. Smith, "Color Kinescope Recoding on Embossed Film" Jul. 1956, pp. 365-372, Journal of the SMPTE, vol. 65.

Rudolf Kingslake, "The Optics of the Lenticular Color-Film Process", Jan. 1958, pp. 8-13, Journal of the SMPTE, vol. 67.

Furukawa, et al., "A ⅓-inch 380K Pixel (Effective) IT-CCD Image Sensor", Jun. 5, 1992, pp. 595-600, IEEE, vol. 38, No. 3.

Deguchi et al., "Microlens Design Using Simulation Program For CCD Image Sensor", Jun. 5, 1992, pp. 583-589, IEEE, vol. 38, No. 3, Aug. 1992.

* cited by examiner

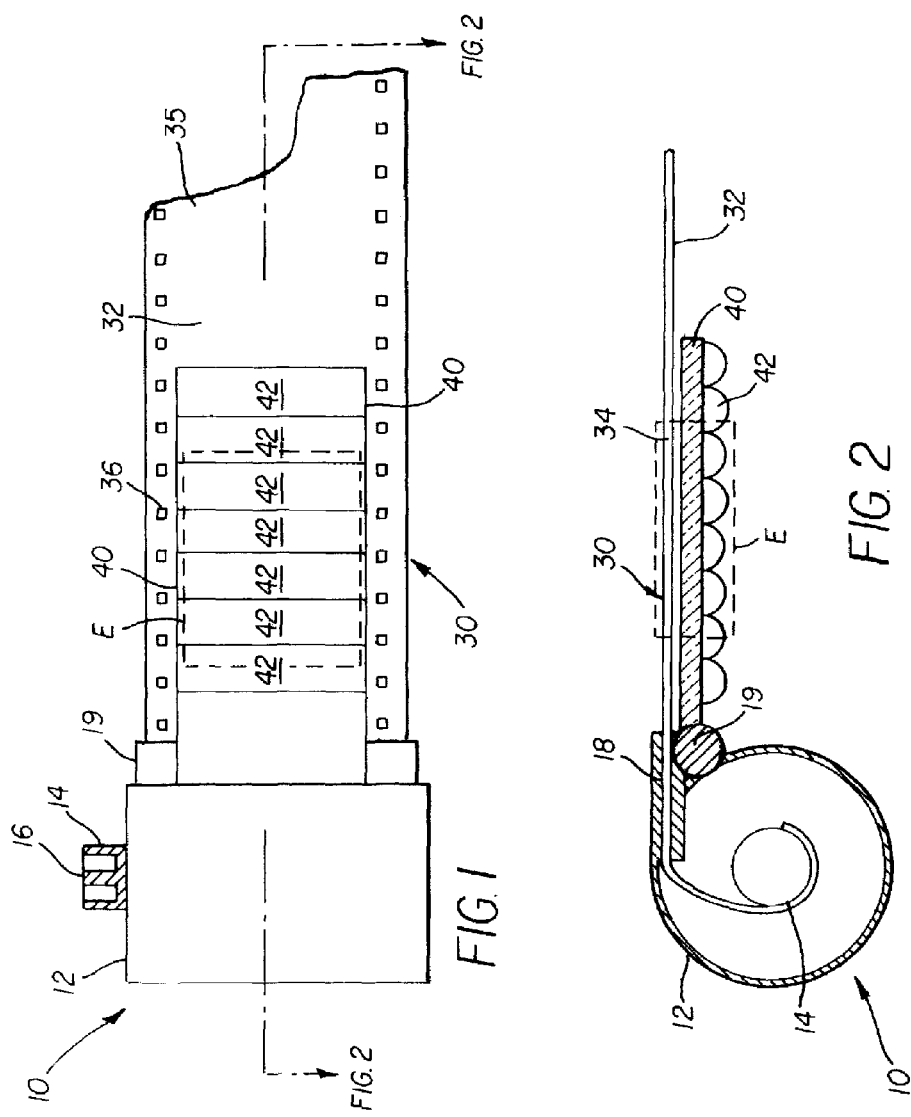

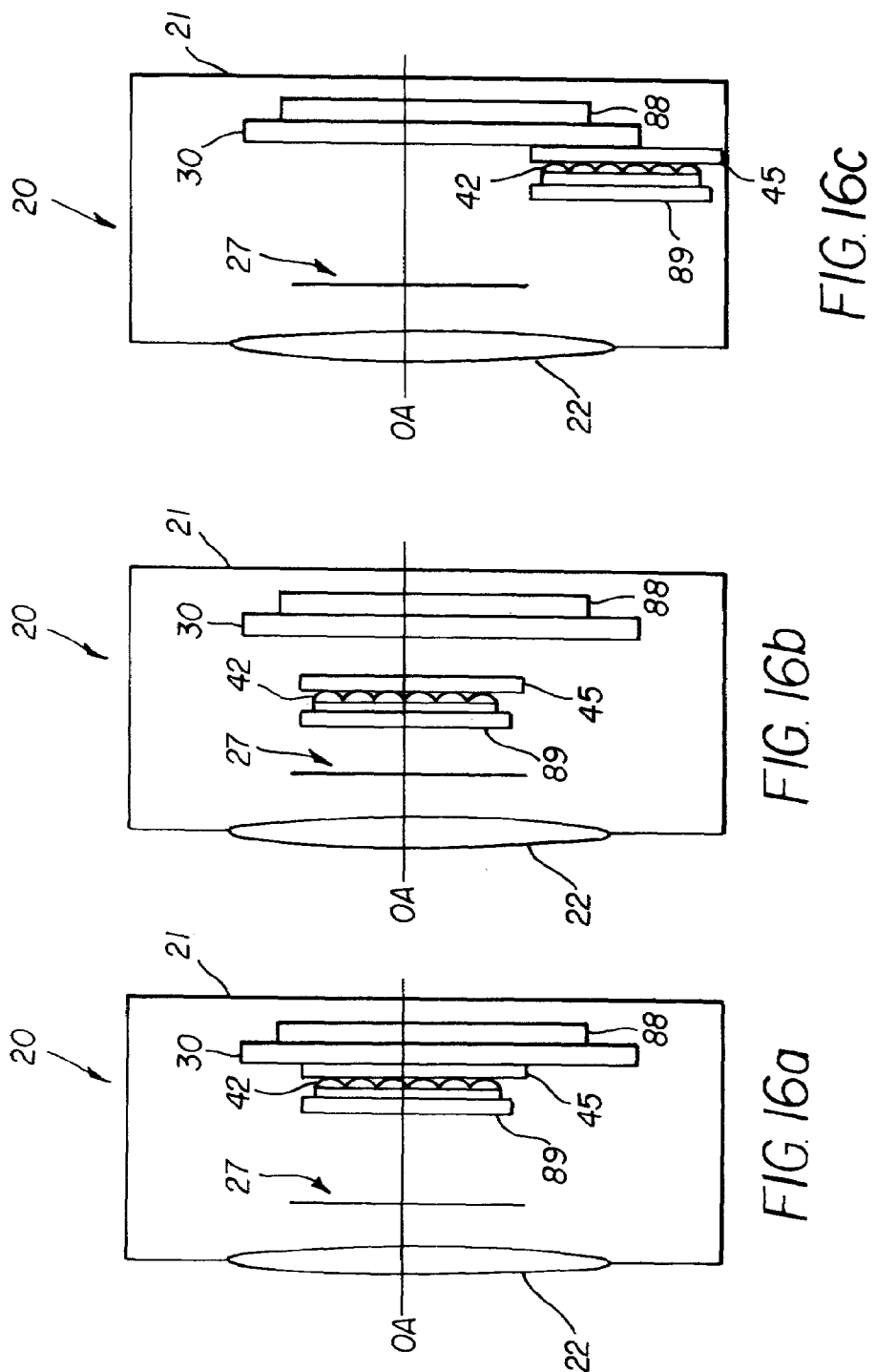

PHOTOGRAPHIC FILM CARTRIDGE OR CASSETTE SYSTEMS WITH MICROLENS

CROSS REFERENCE TO RELATED APPLICATIONS

This application is related to a group of seven previously co-filed and commonly assigned U.S. Patent Applications, namely U.S. patent application Ser. No. 10/170,607, entitled CAMERA SPEED COLOR FILM WITH BASE SIDE MICRO-LENSES; in the names of Lyn Irving and Richard Szajewski; U.S. patent application Ser. No. 10/171,012, entitled LENTICULAR IMAGING WITH INCORPORATED BEADS, in the names of Krishnan Chari, Lyn Irving and Richard Szajewski; U.S. patent application Ser. No. 10/167,746, entitled CAMERA SPEED COLOR FILM WITH EMULSION SIDE MICRO-LENSES, in the names of Richard Szajewski and Lyn Irving; U.S. patent application Ser. No. 10/167,794, entitled IMAGING USING SILVER HALIDE FILMS WITH MICRO-LENS CAPTURE, AND OPTICAL RECONSTRUCTION in the names of Lyn Irving and Richard Szajewski; U.S. patent application Ser. No. 10/170,148, entitled IMAGING USING SILVER HALIDE FILMS WITH MICRO-LENS CAPTURE, SCANNING AND DIGITAL RECONSTRUCTION in the names of Richard Szajewski and Lyn Irving; U.S. patent application Ser. No. 10/281,645, entitled IMAGING USING SILVER HALIDE FILMS WITH INVERSE MOUNTED MICRO-LENS AND SPACER in the names of Richard Szajewski and Lyn Irving, and U.S. patent application Ser. No. 10/326,455 entitled IMAGING SYSTEM HAVING EXTENDED USEFUL LATITUDE in the names of Richard Szajewski and Lyn Irving the contents of which are incorporated herein by reference.

FIELD OF THE INVENTION

This invention is related to micro-lens aided photography.

BACKGROUND OF THE INVENTION

In conventional photography, it is well known to record images by controllably exposing a photosensitive element to light from a scene. Typically, such a photosensitive element comprises one or more photosensitive layers supported by a flexible substrate such as film and/or a non-flexible substrate such as a glass plate. The photosensitive layers, which can have one or more light sensitive silver halide emulsions along with product appropriate imaging chemistry, react to the energy provided by the light from the scene. The extent of this reaction is a function of the amount of light received per unit area of the element during exposure. The extent of this reaction is greater in areas of the element that are exposed to more light during an exposure than in areas that are exposed to less light. Thus, when light from the scene is focused onto a photosensitive element, differences in the levels of light from the scene are captured as differences in the extent of the reaction in the layers. After a development step, the differences in the extent of the reaction in the layers appear as picture regions having different densities. These densities form an image of the original scene luminance distribution.

It is characteristic of silver halide emulsions to have a non-linear response when exposed to ambient light from a scene. In this regard, a photosensitive element has a lower response threshold that defines the minimum exposure at which the incorporated emulsions and associated chemistry begins to react so that different levels of exposure enable the formation of different densities. This lower threshold ultimately relates to the quantum efficiency of individual silver halide emulsion grains. Typically, all portions of a photosensitive element that are exposed to light at a level below the lower response threshold have a common appearance when the photosensitive element is developed.

Further, a photosensitive element also has an upper response threshold that defines the exposure level beyond which the emulsion and associated chemistries no longer enable the formation of different densities. Typically, all portions of an element that are exposed at a level above the upper response threshold will again have a common appearance after the photosensitive element is developed.

Thus photosensitive elements that use silver halide emulsions can be said to have both a lower response threshold and an upper response threshold which bracket a useful range of exposures wherein the photosensitive element is capable of reacting to differences in exposure levels by recording a contrast pattern with contrast differences that are differentiable. The exposure levels associated with these lower and upper thresholds define the exposure latitude of the photosensitive element. To optimize the appearance of an image, therefore, it is typically useful to arrange the exposure so that the range of exposure levels encountered by the photosensitive element during exposure is within the latitude or useful range of the photosensitive element.

Many consumer and professional photographers prefer to use photosensitive elements, camera systems, and photography methods that permit image capture over a wide range of photographic conditions. One approach to meeting this objective is to provide photosensitive elements with extremely wide latitude. However, extremely wide latitude photosensitive elements are fundamentally limited by the nature of the response of the individually incorporated silver halide grains to light. Accordingly, it is common to provide camera systems and photography methods that work to effectively extend the lower response limit and upper response limit of a photosensitive element by modifying the luminance characteristics of the scene. For example, it is known to effectively extend the lower response limit of the photosensitive element by providing supplemental illumination to dark scenes.

It is also known to increase the quantity of the light acting on a photosensitive element without providing supplemental illumination by using a taking lens system designed to pass a substantial amount of the available light from the scene to the photosensitive element during an exposure. However, lenses that pass a substantial amount of light also inherently reduce the depth-of field of the associated camera system. This solution is thus not universally suitable for pictorial imaging with fixed focus cameras since scenes may not then be properly focused. This solution is also not preferred in variable focused cameras as such lens systems can be expensive, and difficult to design, install and maintain.

There is a direct relationship between the duration of exposure and quantity of light from the scene that strikes the photosensitive element during an exposure. Accordingly, another way known in the art for increasing the amount of light acting on a photosensitive element during an exposure is to increase the duration of the exposure using the expedient of a longer open shutter. This, however, degrades upper exposure limits. Further, increased shutter open time can cause the shutter to remain open for a period that is long enough to permit the composition of a scene to evolve. This results in a blurred image. Accordingly, there is a desire to limit shutter open time.

Thus, what is also needed is a less complex and less costly camera system and photography method allowing the capture of images using conventional shutter open times.

Another way to increase the quantity of the light acting on a photosensitive element during an exposure is to use a conventional taking lens system to collect light from a scene and to project this light from the scene onto an array of micro-lenses such as an array of linear lenticular lenses that are located proximate to the photosensitive element. An example of this is shown in U.S. Pat. No. 1,838,173 filed by Chretien on Jan. 9, 1928. Each micro-lens concentrates a portion of the light from the scene onto associated areas of a photosensitive element. By concentrating light in this manner, the amount of light incident on each concentrated exposure area of the photosensitive element is increased to a level that is above the lower response threshold of the film. This permits an image to be formed by contrast patterns in the densities of the concentrated exposure areas.

Images formed in this manner are segmented: the concentrated exposure areas form a concentrated image of the scene and remaining portions of the photosensitive element form a pattern of unexposed artifacts intermingled with the concentrated image. In conventionally rendered prints of such images this pattern has an unpleasing low contrast and a half-tone look much like newspaper print.

However, a recognizable image can be obtained from such segmented images by projection under quite specific conditions. These conditions occur precisely when the spatial relationship between the effective camera aperture, the micro-lens array and the light sensitive element established at exposure in the camera is reproduced in the projector. This system can be cumbersome because a functional real image is produced at a position and magnification dictated by the original scene to camera lens arrangement. If a projection lens identical to the camera taking lens is positioned so as to mimic the camera lens to image relationship that existed at image taking, the reconstructed image will appear at the position of the original object with the size of the original object. Other lens and spatial relationship combinations result in incomplete image reconstruction and the formation of the dots and lines reminiscent of newspaper print. Thus, the micro-lens or lenticular assisted low light photography of the prior art is ill suited for the production of prints or for use in high quality markets such as those represented by consumers and professional photographers.

Micro-lens arrays, and in particular, lenticular arrays have found other applications in photography. For example, in the early days of color photography, linear lenticular image capture was used in combination with color filters as means for splitting the color spectrum to allow for color photography using black and white silver halide imaging systems. This technology was commercially employed in early color motion picture capture and projection systems as is described in commonly assigned U.S. Pat. No. 2,191,038. In the 1950s it was proposed to use lenticular screens to help capture color images using black and white photosensitive element in instant photography U.S. Pat. No. 2,922,103. In the 1970s, it was proposed to expose a photosensitive element through a moving lenticular screen, U.S. Pat. No. 3,954,334, to achieve gradual tinting. Also in the 1970s, U.S. Pat. No. 3,973,953 filed by Montgomery describes an arrangement of micro-lenses and a photosensitive material in which the photosensitive material is kept out of focus to achieve increased photosensitive latitude at the cost of forming imperfect images. In the 1980s, U.S. Pat. No. 4,272,186 filed by Plummer describes a related arrangement of micro-lenses and a photosensitive material further comprising a screen to control the exposure contrast of the system. Here, a separation of at least 2.5 mm is required between the surface of the photosensitive material and the surface of the micro-lens array. This long focal length practically limits the range of useful micro-lens sizes and f-numbers to those compatible with direct view prints but not compatible with enlargements as are required from modem camera films suitable for employment in hand-held cameras. By minimizing the size of the unexposed areas, the line pattern became almost invisible and was therefore less objectionable.

Finally, in the 1990s, linear lenticular-ridged supports having three-color layers and an antihalation layer were employed for 3-D image presentation materials. These linear lenticular arrays were used to form interleaved print images from multiple views of a scene captured in multiple lens cameras, the interleaved images providing a three dimensional appearance. Examples of this technique are disclosed in U.S. Pat. No. 5,464,128 filed by Lo et al. and in U.S. Pat. No. 5,744,291 filed by Ip. It is recognized that these disclosures relate to methods, elements and apparatus adapted to the formation of 3-D images from capture of multiple scene perspectives that are suitable for direct viewing. They fail to enable photography with shutter times suitable for use in hand-held cameras.

U.S. Pat. No. 5,649,250, filed by Sasaki, U.S. Pat. No. 5,477,291 filed by Mikami et al. and Japanese Patent Publication 2001-147,466 filed by Hiroake et al. describe the replacement of single lenses in cameras by multiple instances (eight to sixteen) of smaller lenses to allow either simultaneous capture of multiple instances of the same image on a single frame of film stock or sequential capture of distinct images to enable, for example analysis of such athletic motion as golf swings.

It can also occur that it is useful to capture images under imaging conditions that are above the upper response threshold of the photosensitive element. Such conditions can occur with bright scenes that are to be captured under daylight, snow pack and beach situations. Typically, cameras use aperture control, shutter timing control and filtering systems to reduce the intensity of light from the scene so that the light that confronts the photosensitive element has an intensity that is within the upper limit response of the photosensitive element. However, these systems can add significant complexity and cost to the design of the camera. Further, the expedient of using a lens with a more open aperture to improve the lower threshold limit as discussed earlier simultaneously passes more light and degrades the exposure at the upper response threshold.

Thus, while micro-lens assisted cameras and photography systems known in the art have found a variety of uses, such cameras have yet to fulfill the original promise of effectively extending the imaging latitude of a photosensitive element by effectively altering the lower response threshold of the photosensitive element or the upper response threshold of the element in a way that permits the production of commercially acceptable prints from images at such adjusted levels. What is needed, therefore, is a method and apparatus for capturing lenticular images on a photosensitive element and using the captured photosensitive element image to form a commercially acceptable print or other output.

Further, it will be appreciated that for the ready acceptance of micro-lens assisted imaging in the commercial marketplace, it is preferable that the micro-lens assisted imaging be made available in a way that is compatible with photography equipment such as Single Lens Reflex cameras, reloadable point and shoot cameras and one time use cameras and with conventional film structures and delivery systems.

SUMMARY OF THE INVENTION

In a first aspect of the invention, what is provided is a cartridge for use in a camera. The cartridge has a photosensitive element having an exposure surface and a housing having a storage area for storing the photosensitive element and an opening adapted to permit transport of the photosensitive element from a storage position within a housing to exposure position outside of the housing. A micro-lens array is joined the housing and positioned to confront the exposure surface when the photosensitive element is in the exposure position.

In another aspect of the invention, what is provided is a cartridge for use in the camera. The cartridge has a housing having a photosensitive element with an exposure surface and an opening adapted to permit transport of the photosensitive element from a storage position within the housing to an exposure position outside of the housing. A micro-lens array is joined to the housing and positioned to confront the exposure surface when the photosensitive element is in the exposure position. Wherein each micro-lens is positioned to receive focused light from a scene and adapted to fracture the received light into a first fraction and a second fraction with the first fraction concentrated to form a first image on a first portion of the photosensitive element when light received during an exposure is within a first range, with said second fraction passing onto the photosensitive element to form a second image on a second portion of the photosensitive element when light received during the exposure is within a second range.

In still another aspect of the invention, a camera system is provided. The camera system has a camera body having a chamber adapted to receive a cartridge. A lens system is provided to focus light from a scene toward an exposure area inside the camera body. An exposure control system controllably allows light to pass from the lens system to the exposure area to define an exposure. The cartridge has a housing with an opening adapted to permit transport of a photosensitive element from a storage position within the housing to the exposure area. A micro-lens array is joined to the housing. Each micro-lens is adapted to receive light from the lens system and to concentrate a first fraction of the received light to form a first image on a first portion of the photosensitive element when the amount of light received from the lens system during exposure is within a first range and to pass a second fraction of the light received by the micro-lenses onto the photosensitive element to form a second image on a second portion of the photosensitive element when the amount of light received from the lens system during exposure is within a second range.

In a further aspect of the invention, a camera system is provided for recording images on a photosensitive element having a photosensitive surface said photosensitive element being associated with a cartridge having a memory containing data from which the effective sensitivity of the photosensitive element can be determined. The camera system has a lens unit adapted to focus light from a scene onto the photosensitive element and an exposure control system to controllably pass light from the lens unit to the photosensitive element. A reader reads information recorded in the memory and provides information that is read to the controller. The controller causes the reader to read information in the memory and also causes the exposure control system to expose the photosensitive surface to light from the scene in a manner that is at least in part determined by the information recorded in the memory.

In yet another aspect of the invention, a variable latitude camera system is provided. The camera system has a lens unit for collecting light and focusing that light at an imaging plane and an exposure control system that controllably passes light from the lens unit to the imaging plane during an exposure. An aperture setting system is provided that is adjustable to allow different amounts of light to pass from the scene to the imaging plane during a unit of time. An array of micro-lenses is mounted at the imaging plane and defines a focal plane. A gate positions a photosensitive surface for recording images at the focal plane defined by the micro-lenses.

In another aspect of the invention, a variable latitude camera is provided. The variable latitude camera has a lens unit for collecting light and focusing that light at an imaging plane. An exposure control system controllably passes light from the lens unit to the imaging plane during an exposure. An aperture setting system is provided that adjustably allows different amounts of light to pass from the scene to the image plane during an exposure. An array of micro-lenses is positionable at the imaging plane and, when positioned at the imaging plane receives light from the lens system and focuses that light at a focal plane. A gate positions a photosensitive surface. One of the array and the gate is selectively positioned relative to each other at a first position wherein a portion of the light passing through the imaging plane is focused by the micro-lenses to form differently focused images on distinct portions of the photosensitive element and a second position wherein a single focused image is formed on the photosensitive element.

BRIEF DESCRIPTION OF THE DRAWINGS

FIG. 1 illustrates an elevation view of one embodiment of a of a film cartridge with supported micro-lens.

FIG. 2 illustrates a cross section view of the embodiment of FIG. 1.

FIG. 16a illustrates a camera system having a positionable array of micro-lenses with the micro-lenses actively positioned.

FIG. 16b illustrates the camera system of FIG. 16a with the micro-lenses focally withdrawn from the active position.

FIG. 16c illustrates the camera system of FIG. 16a with the micro-lenses laterally withdrawn from the active position.

DETAILED DESCRIPTION OF THE INVENTION

Cartridge System

Figure 3:
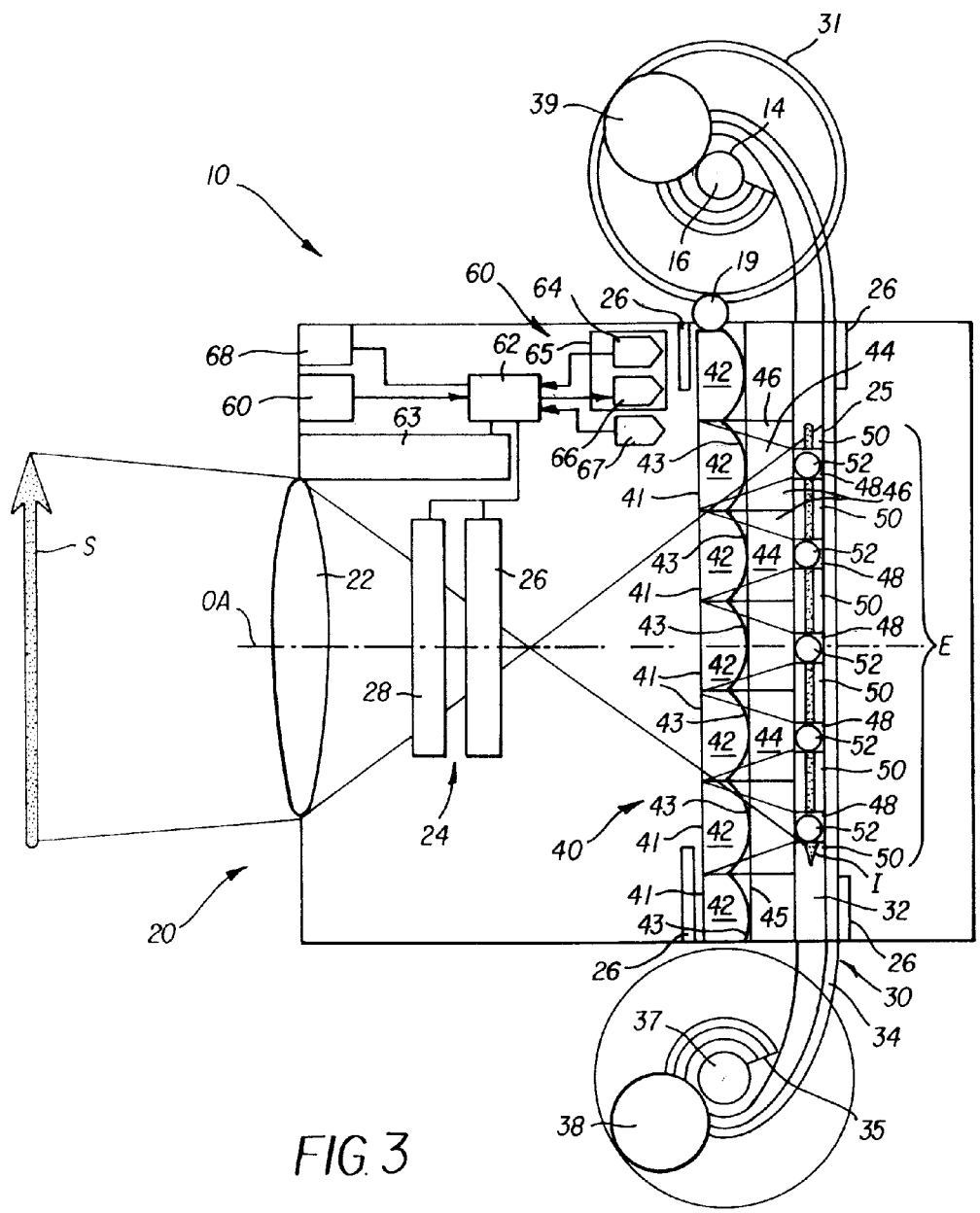
FIG. 3 illustrates the film cartridge with supported micro-lens of FIGS. 1 and 2 as aligned in a camera.

FIG. 1 is an elevation view of one embodiment of the cartridge system 10 of the present invention. FIG. 2 is a cross section view of the embodiment of FIG. 1. As is shown in FIGS. 1 and 2, cartridge system 10 comprises a light tight housing 12 containing a film spool core 14 and an associated drive lug 16 (shown in cross section in FIG. 1) extending out of housing 12. A photosensitive element shown in this embodiment as film 30 is wound about film spool core 14. Housing 12 has an aperture 18 that provides a light tight pathway from which film 30 can be drawn out of housing 12. As shown in FIGS. 1 and 2, a mounting 19 joins an array 40 of micro-lenses 42 to housing 12. Array 40 of micro-lenses 42 extends along a path generally confronting the path of film 30 as film 30 leaves aperture 18.

Film 30 has a photosensitive surface 32 and a support or base portion 34. Film 30 also has, in this embodiment, an arrangement of perforations 36. Perforations 36 can be used for locating film 30, for metering purposes, and for other purposes, as are known in the photographic arts. In the embodiment of FIG. 1, film 30 is shown in a form that generally conforms to the ubiquitous 135 mm film format. However, film 30 can take other forms such as films that comply with the advanced photographic system film format. Other film formats can also be used.

FIG. 3 shows a cartridge system 10 installed in a camera 20. As is shown in FIG. 3, camera 20 comprises a lens system 22 that focuses light from a scene S toward an exposure area E in camera 20. An exposure control system 24 is positioned between lens system 22 and exposure area E. Exposure control system 24 controls the amount of light passing from lens system 22 to exposure area E. Exposure control system 24 includes a shutter system 26 which controllably blocks the amount of light passing from scene S to exposure area E to define an exposure time for forming an image during an image capture operation. Optionally, exposure control system 24 also can include an aperture setting system 28 to limit the amount of light passing to exposure area E per unit of time. Aperture setting system m 28 can comprise any of the manually operated aperture setting systems or automatically operated systems known in the art.

As is shown in FIG. 3, housing 12 of cartridge system 10 is installed in a film supply area 31. Film 30 is drawn from housing 12 through exposure area E into a film receiving area 33 wherein a leader end 35 of film 30 is wound onto a winding spool 37. Camera 20 provides automatic winding and rewinding capabilities by way of a film winding system 38 which can comprise, for example, a motor (not shown) and a gearing arrangement (not shown) adapted to cause winding spool 37 to rotate and thereby draw film 30 through exposure area E so that images can be recorded on successive frames on film 30. Film rewinding capabilities are provided by way of a film rewinding system 39 which can comprise, for example, a motor (not shown) and a gearing arrangement (not shown) adapted to engage drive lug 16 to cause film spool 14 to rotate in a direction that draws film 30 off of winding spool 37. A controller 62 is also provided.

Controller 62 can comprise a microprocessor, programmable analog device, microcontroller, or other conventional control system such as an arrangement of discrete electronic components. Controller 62 controls the operation of film winding system 38 and film rewinding system 39 causing these systems to activate at appropriate times and preventing these systems from activating at the same time.

Controller 62 receives input signals from light sensors 60. Light sensors 60 can include, for example, a shutter trigger button switch (not shown) that is depressed by user of camera 20 to indicate a desire to capture an image. Sensors 60 can also include sensors such as scene illumination sensors, automatic focus distance detecting systems and or other sensor systems known in the photographic arts. A communication system 65 is also optionally provided for reading and/or writing information that is associated with a memory (not shown) on cartridge 10. Communication system 65 can take any conventional form of device for exchanging information. For example, in the embodiment shown in FIG. 1, communication system 65 is shown comprising read head 64 and write head 66. Using techniques known in the art, controller 62 can cause read head 64 to read information associated with cartridge 10 causing read head 64 to read information stored on a memory such as a magnetic strip on film 30 or other forms of memory such as information encoded in patterns of electrically conductive materials on housing 12 as is known in the photographic arts as a DX code, information optically encoded on housing 12, array 40 and/or film 30. Communication system 65 can also have a read head 64 that is adapted to read information stored in a memory such as an electronic semiconductor memory (not shown) associated with cartridge system 10. In one useful embodiment of this type information can be stored in an electronic semi-conductor memory having a radio frequency communication transponder with read head 64 adapted to exchange information in this fashion. As will be discussed in greater detail below, information received in this fashion can include information from which the effective sensitivity of film 30 can be determined. For example, the presence of an array 40 of micro-lenses 42 in association with cartridge system 10 can be determined based upon this information. Optionally, the optical characteristics of the array 40 and film ISO and other characteristics of film 30 can be detected in this fashion.

Cartridge system 10 can also be adapted to receive information written by write head 66. In this regard, write head 66 can write information optically, electrically, magnetically or in other known manners onto housing 12, film 30 or array 40. For example, where housing 12, film 30 or array 40 has a magnetic layer, information can be recorded on that layer. Similarly, information can be optically encoded on film 30. Where a read/write semiconductor memory is associated with cartridge 30, write head 66 can be adapted to write information to the semi-conductor memory.

In the embodiment of FIG. 1, light sensors 60 also include an optional array sensor 67 installed in camera 20. Array sensor 67 can be used to detect whether cartridge 10 is installed in camera 20 that has an array 40 of micro-lenses 42.

Controller 62 receives information received from light sensors 60, and uses this information to operate shutter system 26, aperture control system 28, film winding spool 37, film rewinding system 39 and/or other optional components such as an electronic lens adjustment system 63 for adjusting the optical characteristics of taking lens system 22. In the embodiment of FIG. 3, an optional source of artificial illumination 68 is provided. This source can be, for example, a lamp, strobe, or flash tube or bulb that can be electrically actuated to add illumination to a scene. This source can be activated to provide additional scene illumination for artistic dynamic range shifting purposes. Where artificial illumination 68 is provided, controller 62 will determine exposure settings, aperture settings and/or effective latitude based upon the anticipated presence of this artificial illumination.

In operation, taking lens system 22 directs light from a scene S along optical axis OA. A gate 25 is provided and positions film 30 and array 40 of micro-lenses 42 at a defined distance from taking lens system 22 during exposure. Gate 25 is generally configured as is known in the art with rails, stops and such arranged to form an exposure aperture (not shown) and to position film 30 appropriately for exposure. Other embodiments of gate 25 will also be described in greater detail below. Preferably, the depth of focus of the taking lens system 22 and gate 25 co-operate such that an image I of scene S is formed on a portion of photosensitive surface 32 located at exposure area E with image I of scene S having a consistent focus across exposure area E.

Interposed between taking lens system 22 and film 30 is array 40 which is supplied as an integral part of the film cartridge system 10 and has a plurality of micro-lenses 42. Film 30 and array 40 are shaped so that they can both fit within gate 25. Preferably, film 30 and array 40 are shaped and/or sized so that both film 30 and array 40 can fit within the space provided by a conventional gate 25 of a conventional camera while still permitting camera 20 to advance and rewind film 30 in a manner that is consistent with the way in which camera 20 moves film 30 when a prior art film cartridge not having an array 40 of micro lenses 42 is installed in camera 20. In this way, cartridge system 10 can be used with a multiplicity of conventional cameras. In an alternative embodiment, cartridge system 10 can be designed for use with a co-designed camera 20 that is adapted to receive cartridge system 10.

In practice, micro-lens array 40 is positioned in camera 20 generally parallel to and between taking lens system 22 and film 30 with each micro-lens light receiving surface 41 facing taking lens system 22 and each micro-lens light focusing surface 43 facing film 30. Micro-lens array 40 is generally transparent and of sufficient optical quality to form the desired images. The surfaces of the micro-lens array 40 will generally have a surface roughness of between about 20 and 200 angstroms and preferably a surface roughness of between about 40 and 100 angstroms. The overall thickness of the micro-lenses 42 and an optional associated support structure (not shown in FIG. 3) will be adequate to enforce the needed rigidity to enable adequate photographic performance. Typically, with optical quality glasses and plastics, this thickness is between 0.05 and 20 mm and preferably between 0.1 and 10 mm. However, because array 40 is positioned within gate 25, different thicknesses can be employed so that a common cartridge system 10 can be used in a plurality of conventional cameras.

Accordingly, embossed portions of known transparent or tinted, flexible or rigid materials, such as the materials commonly employed as photographic supports, can be employed as the micro-lens array 40 as can extruded plastic portions, re-melt micro-lens structures and such.

Each of micro-lenses 42 in micro-lens array 40 has a light-receiving surface 41 that receives a portion of the light passing from the taking lens system 22 and a light-focusing surface 43 that fractures this light into a concentrated fraction 44 and a residual fraction 46. In the embodiment of FIG. 3, light focusing surface 43 is separated from photo-sensitive surface 32 of film 30 by a spacer 45. Spacer 45 is defined to allow a desired concentration of the light to be achieved. In the embodiment shown in FIG. 3, spacer 45 is a generally transparent material such as glass, plastic, or other solid material having a thickness defined to achieve a preferred separation. The embodiment shown in FIG. 3, spacer 45 can also perform the useful function of providing structural rigidity to micro-lens array 40.

Figure 4:
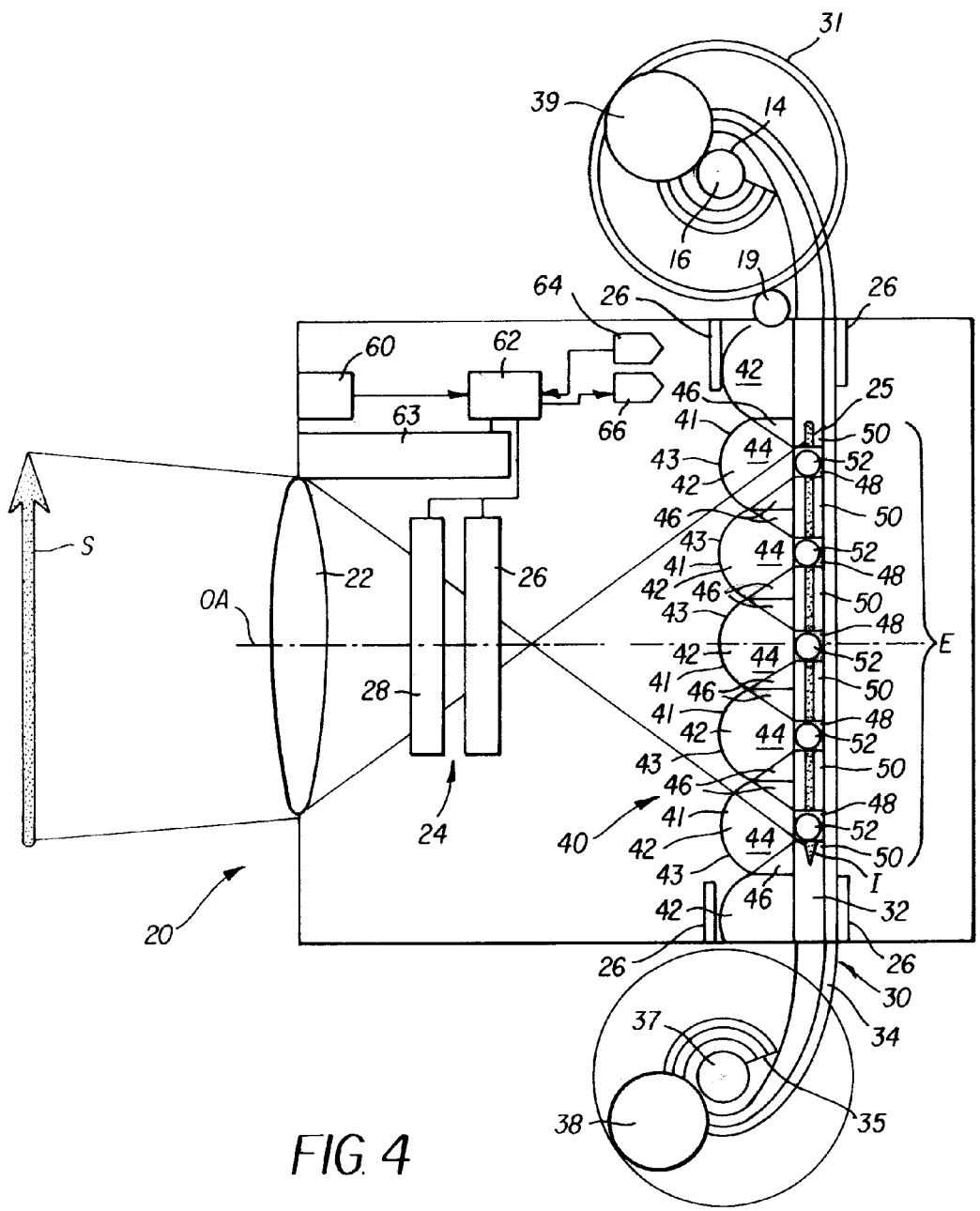
FIG. 4 shows an alternative embodiment of the cartridge system of FIGS. 1 and 2 installed in a camera.

In another embodiment, shown in FIG. 4, light focusing surface 43 and light receiving surface 41 are combined. This embodiment has the advantage of using the structure of micro-lens 42 to provide a preferred separation between light focusing surface 43 and film 30. Accordingly, the embodiment of FIG. 4 can typically be provided with a smaller thickness than the embodiment of FIG. 3 thus making it easier for the array 40 of micro-lens 42 of the embodiment of FIG. 4 to be used in a conventional camera having a conventional gate structure 26.

In an alternative embodiment, mounting 19 can be designed to position array 40 of micro-lens 42 so that a preferred separation is maintained between film 30 and light focusing surface 43.

In yet another embodiment, cartridge system 10 can be employed in preloaded form as in a one-time-use camera as known in the art.

In any of these embodiments, the fracturing of the light from scene S, causes concentrated fractions 44 to be concentrated onto associated concentrated image areas 48 of film 30 while residual fractions 46 of the light pass to an associated residual image area 50 of film 30. The effect of fracturing is shown conceptually in FIG. 3 and will now be described with reference to FIGS. 3, 4 and 5a, 5b and 5c.

Figure 5A:
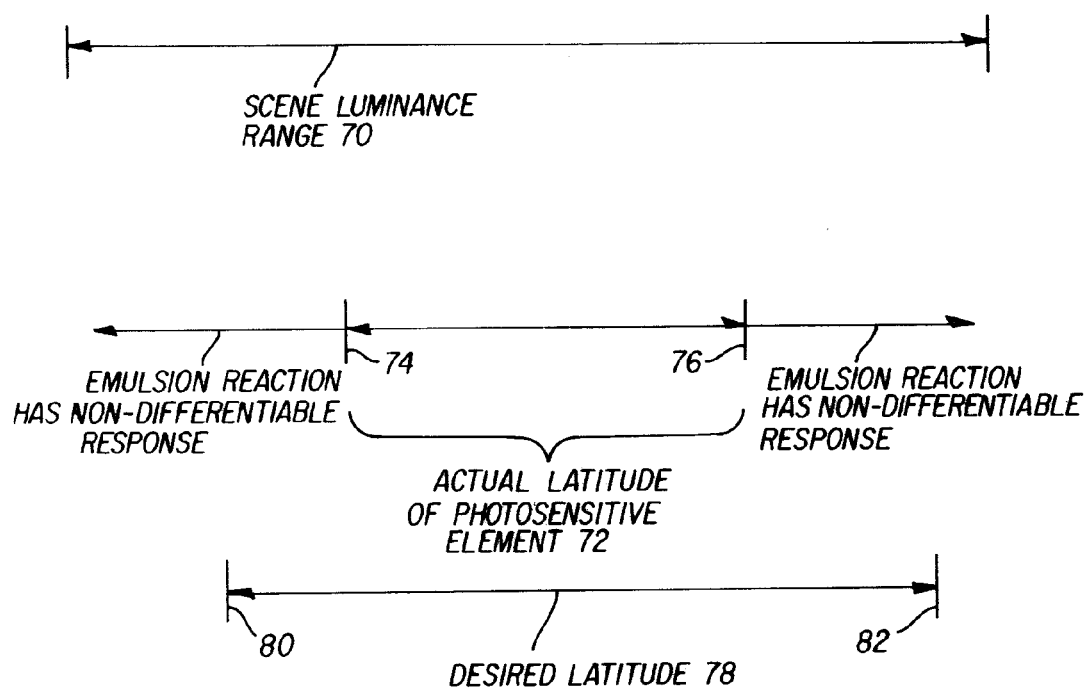
FIG. 5a is a diagram useful in describing the relationship between scene exposure actual latitude and effective latitude.

As is shown in FIG. 5a, light from a photographic scene extends, over a wide range of scene luminances. In the case of available light photography, these are the luminances that are visually observable by humans. This range is indicated in FIG. 5a as scene luminance range 70. However, film 30 has an actual latitude 72 within which film 30 can capture differences in scene illumination and record a contrast image of the scene. Because of the inherent limitations of chemical image capture technology and the specific non-linear response of film 30 to illumination from the scene, the actual latitude 72 of film 30 is defined by a lower response threshold 74 and an upper response threshold 76. Film 30 does not differentiably react to scene illumination differences when film 30 is exposed to quantities of light that are lower than the lower response threshold 74. As noted above, this is because the energy made available by such limited quantities of light is not sufficient to cause the emulsion and associated chemistries to react to form a differentiable exposure record. Accordingly, all portions of film 30 that are exposed to such quantities of light have a generally light appearance when film 30 is photo processed.

Similarly, film 30 does not differentiably react to scene illumination differences when film 30 is exposed to quantities of light that are higher than the upper response threshold 76. As noted in greater detail above, this is because the amount of light received by film 30 above upper response threshold 76 is sufficient to drive the chemical reaction of the emulsions and associated chemistries to a point wherein film 30 no longer has a meaningful additional density response to additional light energy. Because of this, all portions of film 30 that are exposed to such quantities of light have a generally dark appearance when film 30 is photo processed.

It is appreciated that the terms light and dark are appropriate for negative working photosensitive materials such as print films intended for use with negative working papers or for scanning. With positive working photosensitive materials such as reversal slide films and direct print films, the recited areas would be respectively dark and light in characteristic.

Any known photosensitive material formulation can be used to prepare a photosensitive element such as film 30 useful in the practice of the invention. Elements having excellent light sensitivity are best employed in the practice of this invention. In some embodiments, elements can have a sensitivity of at least about ISO 25. In another embodiment, the elements can have a sensitivity of at least about ISO 100. In another embodiment, the elements can preferably have a sensitivity of at least about ISO 400. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number pH 2.27-1981 (ISO (ASA Speed)) and relates specifically to the average of exposure levels required to produce a density of 0.15 above the minimum density in each of the green light sensitive and least sensitive color recording unit of a color film. This definition conforms to the International Standards Organization (ISO) film speed rating. For the purposes of this application, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

While standard photographic elements can be employed, the elements most useful in this invention are designed for capturing an image in machine-readable form rather than in a form suitable for direct viewing. In the capture element, speed (the sensitivity of the element to low light conditions) is usually critical to obtaining sufficient image in such elements. Accordingly, the elements after micro-lens speed enhancement, will typically exhibit an equivalent ISO speed of 800 or greater, preferably an equivalent ISO speed of 1600 or greater and most preferably an equivalent ISO speed of 3200 or greater. The elements will have a latitude of at least 3.0 log E, and preferably a latitude of 4.0 log E, and more preferable a latitude of 5.0 log E or even higher in each color record. Such a high useful latitude dictates that the gamma of each color record (i.e. the slope of the Density vs. log E after photo processing) be less than 0.70, preferably less than 0.60, more preferably less than 0.50 and most preferably less than 0.45. Further, the color interactions between or interimage effects are preferably minimized. This minimization of interimage effect can be achieved by minimizing the quantity of masking couplers and DIR compounds. The interimage effect can be quantified as the ratio of the gamma of a particular color record after a color separation exposure and photo processing divided by the gamma of the same color record after a white light exposure. The gamma ratio of each color record is preferably between 0.8 and 1.2, more preferably between 0.9 and 1.1 and most preferably between 0.95 and 1.05. Further details of the construction, characteristics, and quantification of the performance of such scan enabled light sensitive elements are disclosed in Sowinski et al. U.S. Pat. Nos. 6,021,277 and 6,190,847, the disclosures of which are incorporated by reference.

Figure 5B:
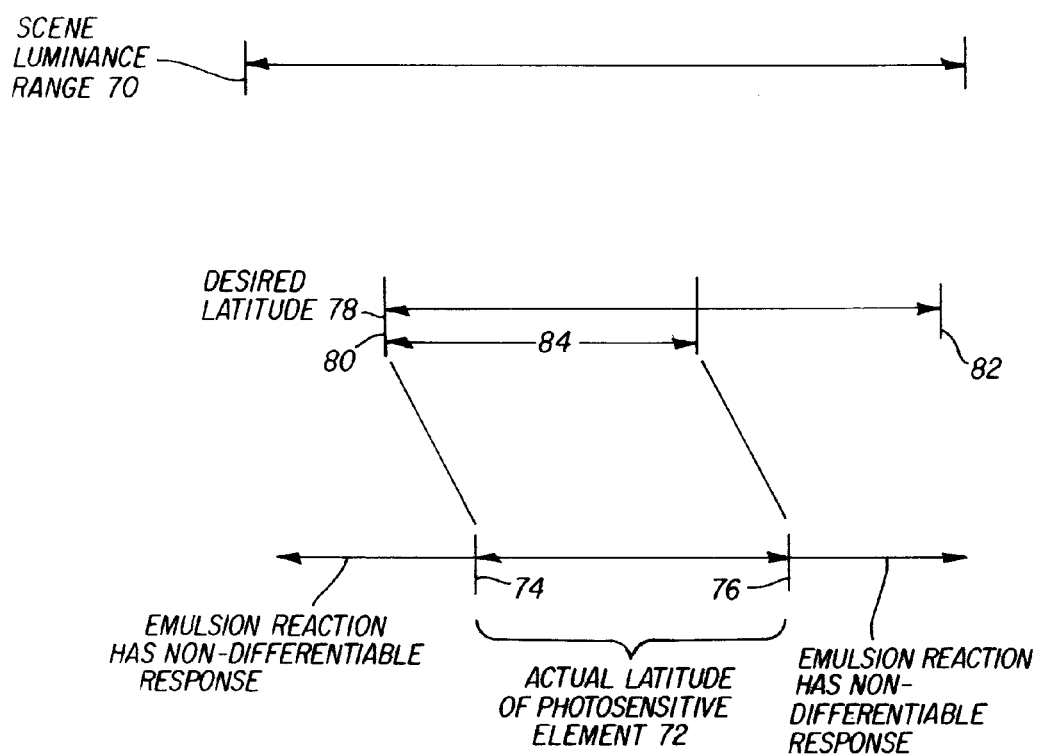
FIG. 5b is a diagram useful in describing the effect of concentrated light on a photosensitive element.

As is also shown in FIG. 5b, it is desirable that camera 20 and film 30 should record scene information at a desired lower response threshold of desired latitude 80 that is lower than the response threshold 74 of film 30. In accordance with the principles of the present invention, photography in this range of illumination is made possible by concentrating light from the scene. In this regard, each of the micro-lenses 42 in micro-lens array 40, fractures light from the scene into at least two portions. As is shown in FIG. 4, a concentrated fraction 44 of light from scene S is concentrated so that a greater amount of light per unit area falls upon each of the concentrated image areas 48 of film 30 during an exposure than would fall upon concentrated image areas 48 in the absence of the micro-lens array 40 of micro-lenses 42. As is shown in FIG. 5b, this increase in the amount of light incident upon concentrated image areas 48 has the effect of shifting a first exposure range 84 of scene exposure levels so that the entire first exposure range 84 is within the actual latitude of photosensitive element 72. This shift allows a pattern of concentrated image elements 52 to form a concentrated image in the concentrated image areas 48 of film 30.

Incidentally, some of the light incident on micro-lenses 42, for example light that is poorly focused by micro-lenses 42, or light that passes between distinct ones of micro-lenses 42 is not focused on concentrated image areas 48. Instead, this residual fraction 46 of the light passes to film 30 and is incident on residual image area 50 enabling formation of a residual image 54. Residual image 54 can further be formed by designed or adventitious light scatter and reflection in film 30 as well as by light flare from reflecting surfaces in the structure of camera 20. This residual fraction 46 is less than the amount of light that would be incident on film 30 in the event that micro-lens array 40 of micro-lenses 42 was not interposed between scene S and film 30 during the same exposure. Thus, micro-lenses 42 effectively filter light from the scene that is incident on residual image area 50 so that a greater quantity of light must be available during the exposure in order for a residual image 54 to be formed on film 30. Accordingly, the predefined period of time that shutter system 26 permits for exposure of film 30 is sufficient to form an image on the residual image area 50 of the photosensitive element when light from the scene is within a second range.

Figure 5C:
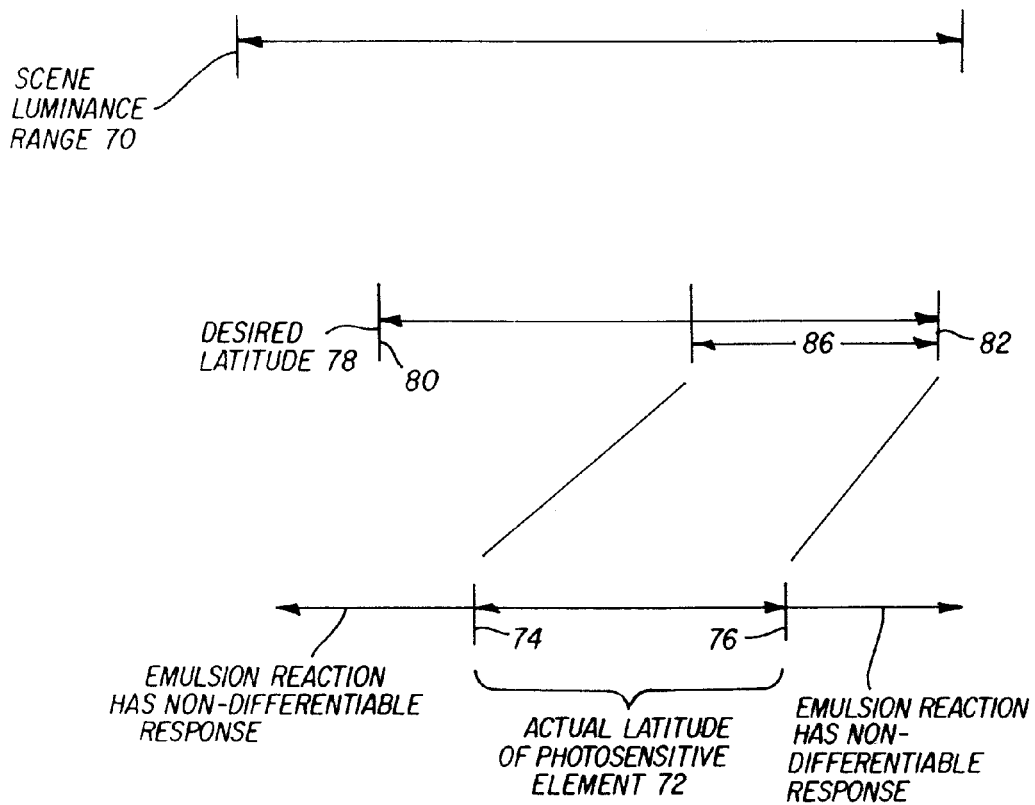
FIG. 5c is a diagram useful in describing the effect of residual light on the photosensitive element.

Accordingly, as is shown in FIG. 5c, when micro-lenses 42 of micro-lens array 40 are exposed to light within a second exposure range 86, a second exposure suitable for producing an image over the range indicated by second exposure range 86 is formed on film 30 in the residual image area 50. In this way, film 30 can be used to record differentiable images at exposure levels that are above the upper response threshold 76 of film 30 but below the desired upper response threshold of desired latitude 82.

A region of overlap can be defined between the first exposure range 84 and second exposure range 86. Where it is desired to greatly increase system latitude desired for photographic element 78, this region of overlap can be contracted. In a preferred embodiment, the ability to capture image information from either of the concentrated image elements 52 or residual image elements 54 over a continuous desired latitude desired for photographic element 78 is ensured by defining a substantial range of exposures wherein first exposure range 84 and second exposure range 86 overlap. Alternatively, it may be preferred to provide a camera 20 wherein there is little overlap or even substantial separation between first exposure range 84 and second exposure range 86. Camera 20, film 30 and micro-lens array 40 having such a substantial separation would effectively operate to capture different images under very different imaging conditions such as daylight and interior light.

It will be appreciated that when an exposure level is in the second exposure range 86, concentrated image elements 52 are formed on film 30. The concentrated image elements 52 formed during exposure in the second exposure range 86 can contain useful imaging information where the first exposure range 84 and second exposure range 86 at least partially overlap. However, where the exposure is above the first exposure range 84 then the concentrated image elements 52 will appear as over exposed artifacts in residual image 54 formed in the residual image area 50.

It will be further appreciated that while this discussion has been framed in terms of a specific embodiment directed towards silver halide photography intended for capturing human visible scenes the invention can be readily applied to capture extended scene luminance ranges and spectral regions invisible to humans and film 30 can use any light sensitive material known to the art that has the requisite imaging characteristics. The effective increase in sensitivity enabled can be at least 0.15 log E. In certain embodiments, the effective increase in sensitivity can be between at least 0.3 log E and 0.6 log E. In another embodiment, the effective increase in sensitivity is at least 0.9 log E.

Figure 6:
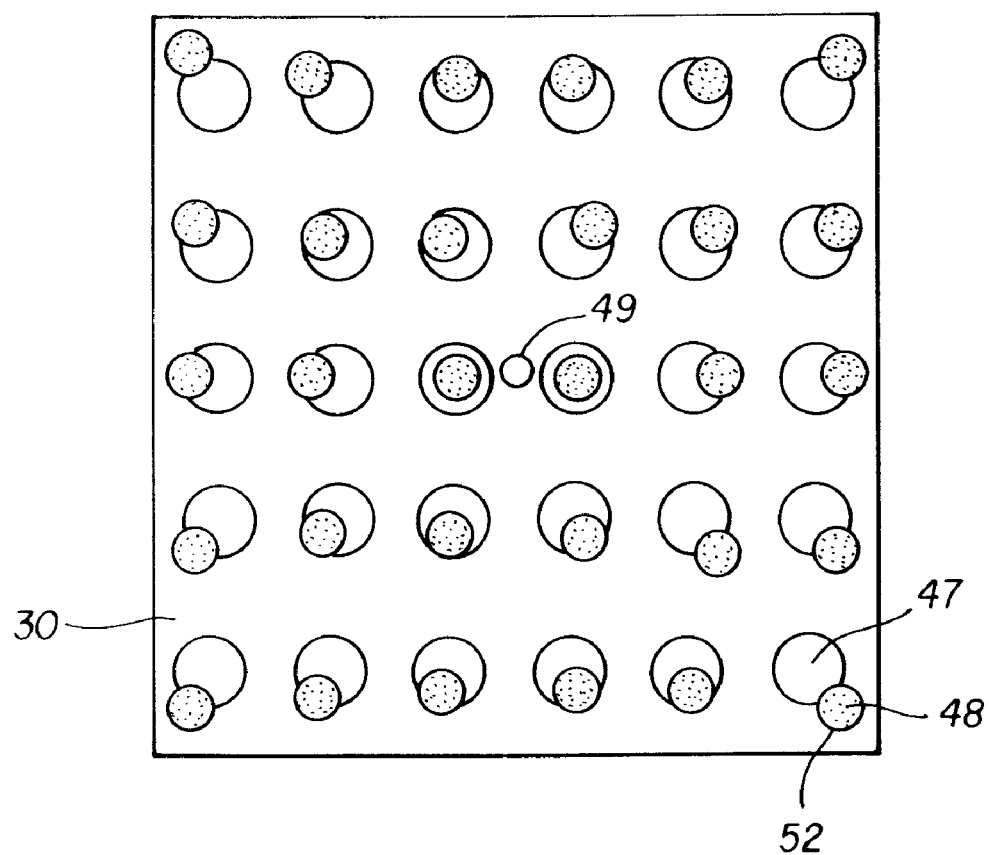
FIG. 6 shows an exposure pattern formed on a film during imagewise exposure through a regular square array of spherical micro-lenses

FIG. 6 shows an exposure pattern formed on film 30 during imagewise exposure through a regular square array of spherical micro-lenses 42. Also shown in FIG. 6, is intersection 49 of optical axis OA and film 30 that is established when film 30 is mounted in camera 20 and exposed through taking lens system 22. Expected image areas 47 are the direct on-axis projections of the individual micro-lenses 42 onto film 30. As can be seen in FIG. 6, the further that the individual expected image areas 47 are from the intersection of optical axis OA and film 30, the larger the displacement between the expected image areas 47 and the actual concentrated image areas 48. The extent of the displacement of the concentrated image elements 52 from the expected image areas 47 is controlled by the optical characteristics of camera 20, taking lens system 22, and micro-lenses 42. Methods and apparatus that can compensate for this displacement are described in the co-pending and commonly assigned U.S. patent application Ser. Nos. 10/167,794 and 10/170,148 cited above.

Figure 7:
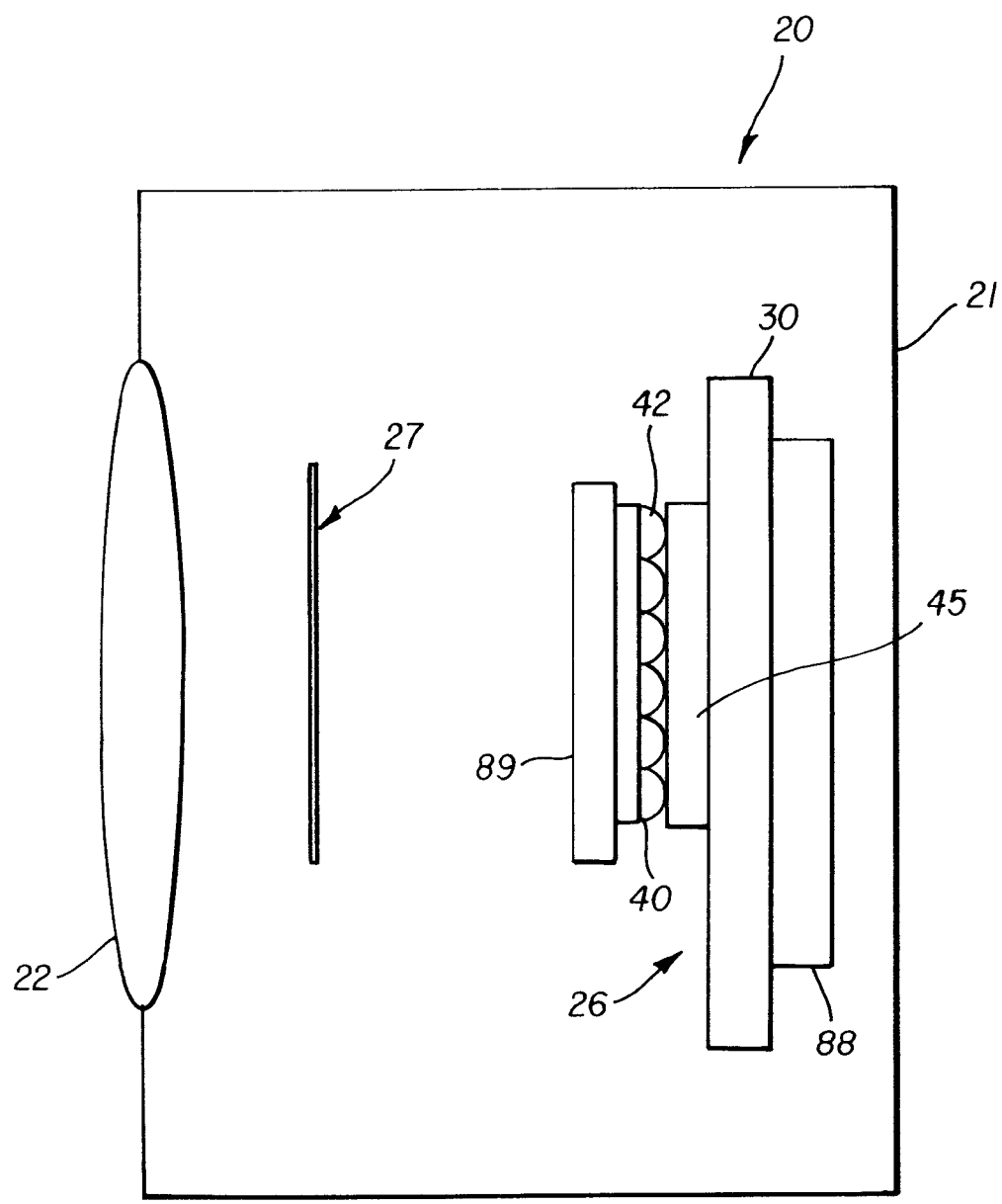
FIG. 7 illustrates another embodiment of a film cartridge system with micro-lens array has loaded into a camera.

FIG. 7 illustrates film cartridge system 10 with micro-lens array 40 as loaded into camera 20 having a clamping type gate 25. In the embodiment shown, micro-lens array 40, has micro-lenses 42 with light focusing surfaces 43 protruding away from the primary lens system 22 and toward film 30. The individual micro-lenses 42 and the surrounding medium, typically air (not shown), define a focal plane offset from light focusing surface 43 of micro-lenses 42. The focal length of the individual micro-lenses 42 is typically between 1 and 10 times the radius of curvature of micro-lenses 42. Accordingly, when micro-lenses having particular radiuses of curvature are used, it is important to ensure that film 30 and array 40 maintain the proper positioning, flatness and alignment with respect to each other.

Accordingly, camera 20 has an embodiment of a gate 25 that is adapted to clamp film 30 and array 40 at the focal plane of taking lens system 22. In this embodiment, gate 25 comprises an element contact surface 88 and a pressure plate assembly 89. Positioning, flatness and alignment of film 30 and array 40 can be aided by positioning film 30 against element contact surface 88. Element contact surface 88 is adapted to contact film 30 without damaging film 30. Element contact surface 88 can, for example, have matte beads (not shown) distributed thereon as are known in the art of photography. Such matte beads can have a diameter of between 0.1 to 2 micro-meters and a distribution generally covering the surface area of element contact surface 88. Coatings of various materials can also be used, such as, for example, mineral oil, silicone oil and carnuba wax. Other materials that can usefully be used with element contact surface 88 are described in a paper entitle "Coating Physical Property Modifying Addenda" IX published in Research Disclosure 38957, Volume 389 in September 1996.

In the embodiment of FIG. 7, film 30 and array 40 are clamped against element contact surface 88 using pressure plate assembly 89. Pressure plate assembly 89 can be formed by guides or rails integral to camera body 20. Spacer 45 and pressure plate assembly can be individually or collectively reversibly compressible and act to passively position film 30 relative to micro-lens array 40. It is recognized that where array 40 includes spacer 45, spacer 45 will also be positioned between micro-lenses 42 and film 30 and will shift the focal plane to a degree defined by the refractive index of spacer 45. Preferably, film gate 25 will position film 30 in accordance with the shift in focal plane occasioned by the presence of spacer 45. It is appreciated that the relative positions of contact surface 88 and pressure plate assembly 89 can be reversed if convenient.

Figure 8:
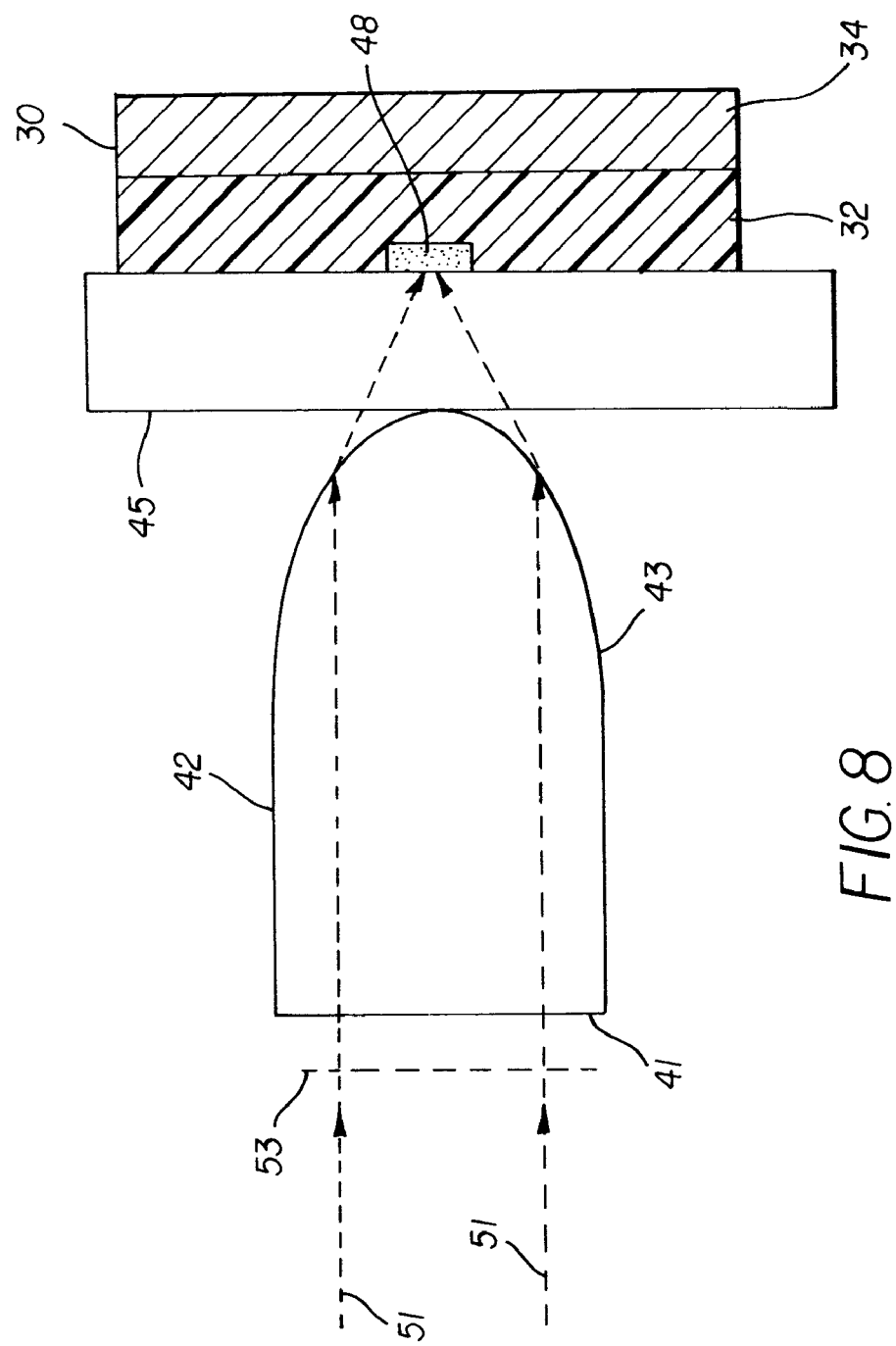
FIG. 8 illustrates with ray tracing light concentration caused by the embodiment of FIG. 7.

FIG. 8 illustrates, with ray tracing, light concentration of a single instance of a micro-lens 42 with light focusing surfaces 43 protruding away from the primary lens system 22 and toward film 30 and also having a spacer 45 there between. Here, two illustrative light rays 51 collimated by the primary lens system 22 are shown as they interact with a single instance of a micro-lens 42 of micro-lens array 40. Light rays 51 are nearly parallel as they strike light receiving surface 41 of micro-lens array 40 and are converged while leaving the array by convex light focusing surface 43 of micro-lens 42 to focus light that passed through plane 55 (corresponding to the projected area of a single micro-lens 42) to a smaller concentrated image area 48 of film 30.

When film 30 is a silver halide film, the film stock can be supplied in roll form and camera 20 can have a film winding system 38 to sequentially supply unexposed portions of the film stock to gate 25 as discussed above. Gate 25 can be designed to enable exposure of rectangular portions (or image frames) of film stock, typically in an aspect ratio of between 1.33:1 to 2:1 or even higher in panoramic formats. Gate 25, micro-lens array 40, optional spacer 45, contact surface 88 and pressure plate assembly 89 can have a modest radius of curvature to disposition film frame concave towards the primary lens system 22 so as to facilitate even film illumination during exposure and to facilitate film advance through the camera, both as known in the art. For example, U.S. Pat. No. 4,833,495 by Ohmura et al. illustrates a modestly curved film path that serves these needs. In another embodiment, film 30 can be drawn by tension across spacer 45 that induces the desired curvature in film 30. In other embodiments, arrangements of film rails, modestly curved transport paths and modest film stock tension, all as known in the art, can serve to position the film stock at an appropriate focal plane.

In the foregoing discussion, the use of an array 40 of micro-lenses 42 has been generally described. The individual micro-lenses 42 of array 40 are convergent lenses in that they are shaped so as to cause light to converge or be focused. In one embodiment, light focusing surfaces 43 form convex projections from array 40 or concave recesses into array 40. The individual projections are shaped as portions of perfect or imperfect spheres. Accordingly, micro-lenses 42 can be spherical portion lenses or they can be aspherical portion lenses or both types of micro-lenses can be simultaneously employed. A spherical portion micro-lens has the shape and cross-section of a portion of a sphere. An aspherical portion micro-lens has a shape and cross-section of a flattened or elongated sphere. The lenses are micro in the sense that they have a circular or nearly circular projection with a diameter of between 1 and 1000 microns. A cylindrical portion micro-lens has the shape and cross-section of a portion of a cylinder. An acylindrical portion micro-lens has a shape and cross-section of a flattened or elongated cylinder. In particular, the forgoing discussion has generally presumed and described the use of the present invention in concert with a close packed cubic micro-lens array 40 of spherical micro-lenses 42. It will be appreciated that various configurations of micro-lenses 42 and micro-lens array 40 can be used.

Figure 9A:
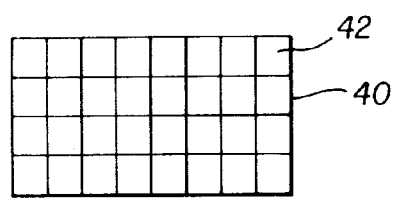
FIGS. 9a-9e illustrate embodiments of an array of micro-lenses useful in practicing the present invention.
Figure 9B:
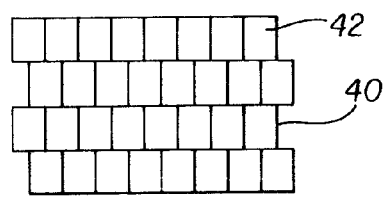
Figure 9C:
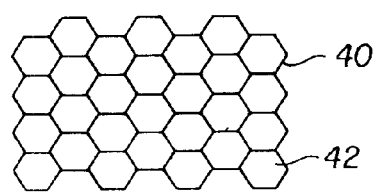
Figure 9D:
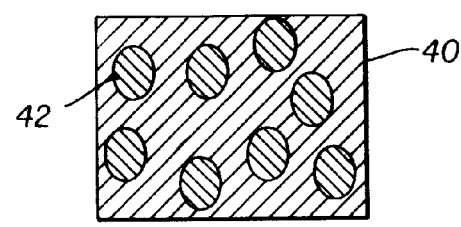
Figure 9E:
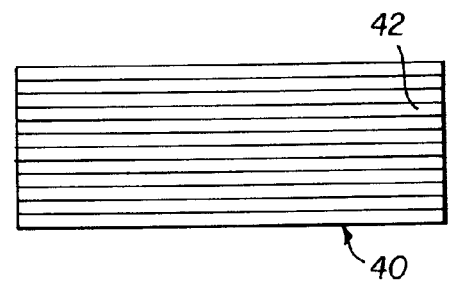

FIGS. 9*a*-9*e* illustrate several such configurations. For example, FIG. 9*a* shows; conceptually, a micro-lens array 40, of micro-lenses 42 arranged in a uniform cubic close packed distribution pattern. For example, FIG. 9*b* shows another embodiment having an off-set square close packed array pattern. In another embodiment shown in FIG. 9*c* micro-lenses 42 are arranged in micro-lens array 40 having a hexagonal close packed array pattern. Micro-lens array 40 can also feature random distributions of micro-lenses 42. One embodiment of an array having a random distribution is shown in FIG. 9*d*. As is also shown in FIG. 9*e* in still another embodiment, micro-lens array 40 can comprise an array of cylindrical or acylindrical micro-lenses 42.

Figure 10A:
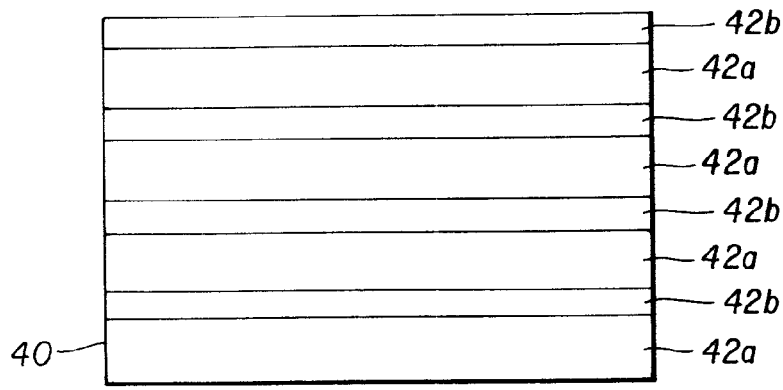
FIGS. 10a-10c illustrate various embodiments of arrays of different micro-lenses that can be usefully combined in a single array of micro-lenses.
Figure 10B:
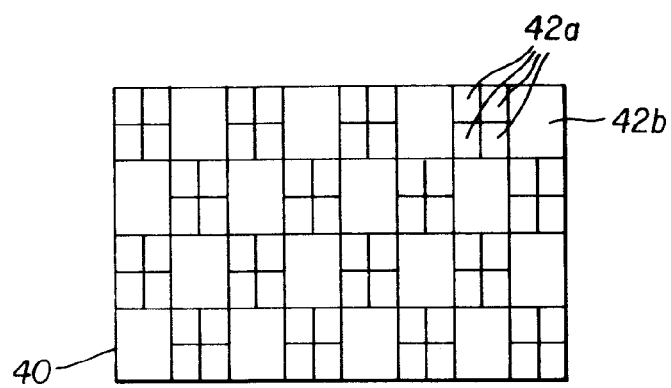
Figure 10C:
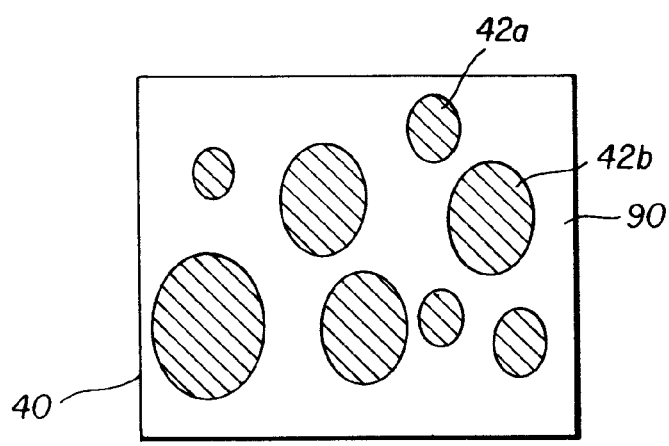
Figure 10D:
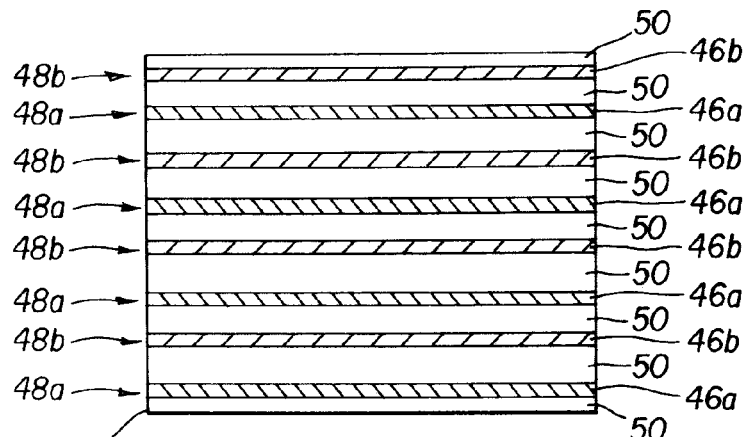
FIG. 10d-10f illustrate patterns recorded on a photosensitive element by imagewise exposure of the photosensitive element to light from a scene passing through, respectively, the arrays of FIGS. 10a-10c.
Figure 10E:
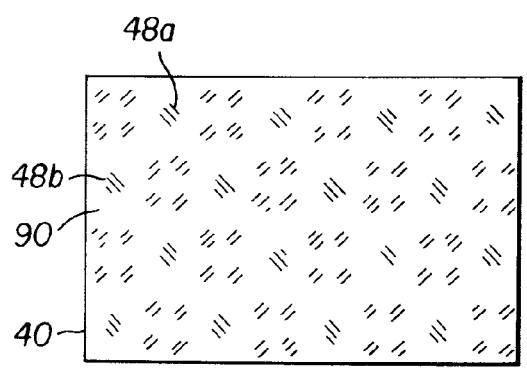
Figure 10F:
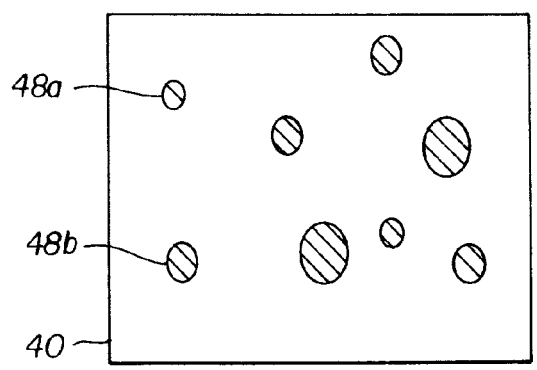

As is shown in FIGS. 10*a*, 10*b* and 10*c*, micro-lens array 40 can comprise micro-lenses 42 having different optical characteristics. In the embodiment of FIG. 10*a*, micro-lens array 40 of cylindrical micro-lenses 42 is shown. As is shown in FIG. 10*a*, micro-lens array 40 has a first set of micro-lenses 42*a* that have a greater cross-section area than a second set of micro-lenses 42*b* also provided by micro-lens array 40. In this embodiment, the first set of micro-lenses 42*a* concentrate a greater portion of light during an exposure than micro-lenses 42*b*. Thus, the first set of micro-lenses 42*a* form a line image exposure on film 30 as shown in FIG. 10*d*, in a first set of concentrated image areas 48*a*, when the amount of the light during the exposure is within a first exposure range 84. When a light from the scene within a second exposure range 86, the second set of micro-lens array 40*b* form a line image on film 30 in a second set of concentrated image areas 48*b*. Light that is not concentrated by either set of micro-lenses 42*a* and 42*b* can form a residual image (not shown) in residual image area 50 of film 30 of FIG. 10*a*.

Similarly, FIGS. 10*b* and 10*c* each show the use of a micro-lens array 40 having differently sized sets of micro-lenses 42*a* and 42*b* with the micro-lens array 42*a* concentrating light to form an exposure and directing that light onto concentrated image areas 48*a* on photosensitive element, while micro-lenses 42*b* concentrate light from a scene and direct this light onto concentrated image areas 48*b* on film 30. Here too, residual portions of the light are recorded in residual image areas 50 of film 30. Thus, in these embodiments the effective sensitivity of the film 30 can be further extended.

As is shown in FIG. 10*c*, the surface coverage of micro-lenses 42 does not have to be maximized. While any useful surface coverage of micro-lenses 42 can be employed, the ratio of the projected area of the micro-lenses 42 to the projected area of the photographic or film 30, can be at least 20 percent. In one embodiment, the coverage can be between at least 50 percent and up to 85 percent. In another embodiment, surface coverage of 85 percent up to the close-packed limit can be used. The precise degree of surface coverage can be adjusted to enable varying levels of exposure sensitivity while maintaining useful photographic graininess and sharpness. In any embodiment where the surface coverage is less than the close packed limit, support 90 can be defined to allow residual light to strike film 30.

Micro-lens array 40 can comprise a set of individual micro-lenses 42 that are formed together or joined together, for example by extrusion, injection molding and other conventional fabrication techniques known to those in the art. Micro-lens array 40 can also be formed by combining a plurality of separate micro-lenses 42 fixed together by mechanical or chemical means or by mounting on support 90. Micro-lens array 40 can comprise a set of beads or spheres (not shown) that are positioned proximate to or coated onto a supporting structure. Micro-lenses 42 may be formed in any matter known in the microstructure art. These micro-lenses 42 may be unitary with the array structure as, for example, by being embossed or molded directly into the array structure at manufacture or they may be integral to a distinct layer applied to a supporting structure. In still other embodiments, a micro-lens array 40 can be formed using a photosensitive coating.

Figure 11A:
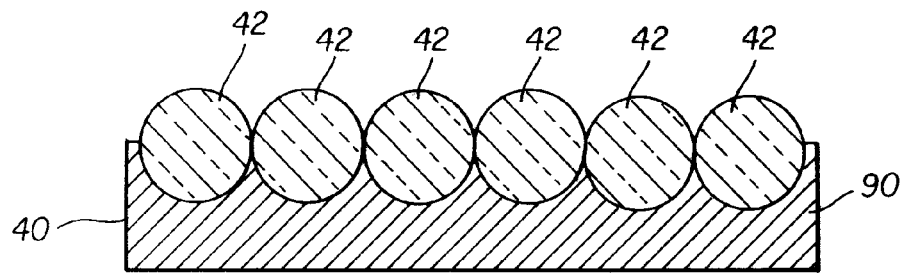
FIG. 11a-11c illustrate of arrays of micro-lenses, spherical and aspherical lenses.
Figure 11B:
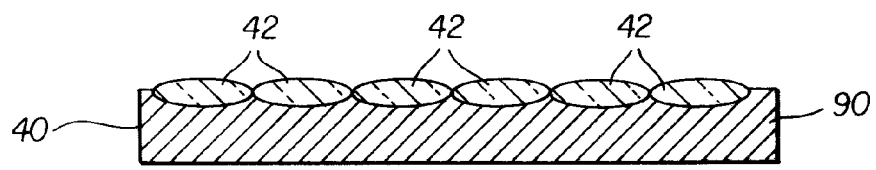
Figure 11C:
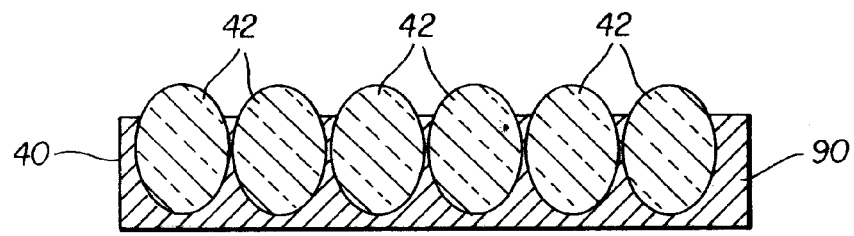

FIGS. 11*a*-11*c* shows a cross-sectional view of micro-lenses 42 having a convex focus surface and support 90 and exhibiting example embodiments of various spherical and aspherical micro-lenses 42. FIG. 11*a* shows an embodiment wherein micro-lenses 42 comprise spherical lenses joined by support 90. FIGS. 11*b* and 11*c* show embodiments of micro-lens array 40 having aspherical micro-lenses 42. It is appreciated that any of the above described array patterns may be combined with aspherical micro-lenses 42 to provide extended sensitivity. Further, any of the patterns of micro-lenses 42 can be applied in a non-close packed manner to enable extended photographic sensitivity.

Micro-lenses 42 are shown with distinct hatching to illustrate the spherical and aspherical character of the protruding portion that actually forms the micro-lens. Aspherical micro-lenses 42, of the type shown in FIGS. 11*b* and 11*c*, are especially useful for this application in that the variable radius of such lenses allows for control of the lens focal length and lens aperture nearly independently of the spacing between the micro-lenses and the light sensitive layers. While these cross-sections have been described as spherical or aspherical, it is fully appreciated that the diagrams equally represent in cross-section cylindrical or acylindrical micro-lenses 42. In each embodiment of array 40 shown in FIGS. 11a-11c, light focusing surface 43 focuses light that enters light receiving surface 41.

The light concentration or useful photographic speed gain on concentrating light focused by taking lens system 22 with a circular projection micro-lens 42 is the square of the ratio of f-numbers of camera 20 and micro-lenses 42. Speed gain (in log relative Exposure) in such a system can be determined as the speed gain equals 2× log (camera lens f-number/micro-lens f-number). The light concentration or useful photographic speed gain of cylindrical micro-lenses allow only the square root of such an improvement because they concentrate light in only one direction. The concentration of light by micro-lens array 40 enables both a system speed gain and forms an exposure pattern on the light sensitive material.

The dimensions of camera 20 and the detailed characteristics of the taking lens system 22 dictate the lens pupil to image distance, i.e. the operating camera focal length. Preferably, an image is formed at array 40 of micro-lenses 42. The characteristics of micro-lenses 40 dictate their focal length. The micro-lens images are formed at photosensitive surface 32. The f-number of camera taking lens system 22 controls the depth-of-focus and depth-of-field of camera 20 while the micro-lens f-number controls the effective aperture of camera 20. By using a stopped down f-number for the camera lens, excellent sharpness along with wide depth of focus and depth of field are obtained. By using an opened f-number for micro-lens array 40, high system speed is obtained with emulsions that are typically thought of as "slow." This extra speed allows available light photography without the thermal and radiation instability typically associated with "fast" emulsions.

Accordingly, a useful combination of lens system 22 and micro-lenses 42 f-numbers will be those that enable system speed gains. System speed gains of more than 0.15 log E, or ½-stop, are useful, while system speed gains of 0.5 log E or more are preferred. While any micro-lenses 42 having an f-number that enables a speed gain with lens system 22 having adequate depth-of-field for an intended purpose can be gainfully employed, typically micro-lenses 42 having f-numbers of 1.5 to 16 are useful. In certain embodiments, micro-lenses 42 having f-numbers in the range of f/2 to f/7 are useful. In other embodiments, micro-lenses 42 having f-numbers in the range of f/3 to f/6 are preferred.

Preferred design parameters for micro-lenses 42 and their relationship to the light sensitive layers of film 30 follow from these definitions:

Micro-lens radius is the radius of curvature of the hemispheric protrusion of micro-lenses 42. For aspherical micro-lenses 42 this value varies across the surface of the micro-lens.

Micro-lens aperture is the cross sectional area formed by the micro-lens typically described as a diameter. For spherical micro-lenses this diameter is perforce less than or equal to twice the micro-lens radius. For aspherical micro-lenses this diameter can be greater than twice the smallest radius encountered in the micro-lens. Use of differently sized micro-lenses having distinct apertures enables distinct levels of speed gain on a micro-scale and thus enables extended exposure sensitivity for a photographic layer.

Micro-lens f-number is the micro-lens aperture divided by the micro-lens focal length. For spherical micro-lenses, the desired micro-lens focal length can be used to define an appropriate micro-lens radius following a lens equation, thusly:

Micro-lens radius is the micro-lens focal-length times $(n_2-n_1)/n_2$; where $n_1$ is the refractive index of the material outside the micro-lens (typically air with a refractive index of unity) while $n_2$ is the refractive index of the micro-lens and any contiguous transmissive material e.g. (plastics as used in micro-lens array 40) While glasses, minerals and plastics having a refractive index of 1.4 to 1.6 are specifically contemplated, any known transmissive materials with appropriate mechanical properties can be employed. Following the known refractive indices of typical photographic system components, useful spherical micro-lenses will have a micro-lens focal length about 2 times the micro-lens radius $((n_2-n_1)/n \sim ½)$. In this context, it is appreciated that aspherical micro-lenses 42 enable a greater degree of design flexibility in adjusting micro-lens aperture and focal length to the other system requirements. When there are intervening structures, as for example spacer 45, they can be on the order of 10 to 800 microns or more in thickness. In the embodiment of FIG. 4, the micro-lens array 40 of micro-lenses 42 is separate from film 30 and is separately mounted in camera 20 between lens system 22 and gate 25. In this embodiment, the focal length is dictated by the differences in refractive index between the micro-lens material and the surrounding medium, typically air and the micro-lens radius of curvature. Additional details can be found in the cross-referenced and commonly assigned U.S. patent application Ser. Nos. 10/167,746 and 10/170,148, the disclosures of which are incorporated by reference.

Micro-lens focal length sets the preferred distance from micro-lenses 42 and photosensitive layers of film 30. The distance from the light-focusing surface 43 of the micro-lnes array 40 to the near surface of film 30 will generally be between 0.5 and 5 times the micro-lens focal length and preferably between 0.7 and 2 times the micro-lens focal length and most preferably between 0.9 and 1.5 times the micro-lens focal length. The near focal length of the micro-lens array is the closest approach between the light focusing surface 43 and film 30 that forms an adequate photographic image while the far focal length the far focal length of the micro-lens array is the farthest approach between the light focusing surface 43 and film 30 that forms an adequate photographic image. This distance can be maintained, for example, by using a gate structure 25 or spacer 45 which positions film 30 apart from the focusing surfaces. Spacer 45 and pressure plate assembly 89 can also be used. In one embodiment the distance between the micro-lens light focusing surface 43 and film 30, i.e. the near focal length can be between 5 and 1500 microns. In other embodiments, the distance can be between 10 and 800 microns. In still other embodiments, the distance can be 20 and 400 microns.

While any useful number of micro-lenses 42 can be employed per image frame to achieve the desired results, it is recognized that the actual number to be employed in any specific configuration depends on the configuration. Micro-lens apertures or pitches of 3 to 100 microns can be used. Where images are to be recorded on a 135-format frame, roughly 24 by 36 mm in extent, between about 86 thousand and 96 million micro-lenses 42 can be used to provide full surface coverage.

Since the photosensitive layers 32 of film 30 have a finite thickness, it is appreciated that use of micro-lenses 42 can enable distinct color records of a multilayer multicolor color film to be preferentially enhanced for sensitivity. This feature arises because of the finite thickness of the light sensitive layers of a color film and the layer wise sequential arrangement of the color records of a camera speed color light sensitive material suitable for use in hand held cameras.

The light sensitive layers are typically between 15 and 45 microns in thickness in a dry state and the layers which form the blue sensitive color record are typically arranged nearest to an exposure source while the layer which form the red sensitive color record are typically arranged farthest from an exposure source of all the color records. The layerwise enhancement of sensitivity can be especially important in specific unbalanced lighting situations such as dim incandescent lighted interiors that are blue light poor and red light rich. In systems intended for incandescent photography the micro-lenses can be focused on the film's blue sensitive layers thus providing a preferential speed boost to the color record and improved color balance. Conversely, in systems intended for underwater photography, which are red light poor and blue light rich, the micro-lenses can be preferentially focused on the film's red sensitive layers thus providing a preferential speed boost to the color record and improved color balance. In other situations, other colors can be preferentially boosted. Films can be provided with uncommon layer orders to be employed specifically with micro-lenses providing exposure boosts to specific depth wise regions of a layer wise film.

Light from the scene can be passed through more than one array of micro-lenses 40. For example, light from the scene can be passed through a first micro-lens array having hemi-cylindrical micro-lenses arrayed along a horizontal axis and then passing this compressed light through a second micro-lens array having hem-cylindrical micro-lenses arrayed along a vertical axis. This technique can be usefully employed to cause bi-axial concentration of the light from the scene.

As is noted above, the images recorded on film 30 in accordance with the embodiments of the present invention, although viewable, are intended for machine reconstruction into a directly viewable form. In this regard, camera 20 has been shown in FIG. 4 as incorporating a camera controller 62 that cooperates with a light sensor 60, lens adjustment system 63, communication system 65, and/or array detector 67 to record information on film 30 that indicates that film 30 is to be photofinished in a manner that permits conversion of the machine readable image into a form that is suitable for direct viewing. Methods and apparatuses for optically and electronically extracting directly viewable images from such machine-readable images are described in greater detail in these applications. As noted in the cross-referenced cases, information regarding scene brighteners and lens position may also be useful in the reconstruction process and therefore, may be recorded on film 30.

Details of scene luminance fractionation and reconstruction along with micro-lens sizing, shape and optical properties are disclosed in cross referenced and commonly assigned U.S. patent application Ser. Nos. 10/167,746 and 10/170,148, the disclosure of which are incorporated by reference.

It is appreciated that the forgoing discussion of effective photographic speed and latitude enhancement in micro-lens enabled photographic systems as illustrated diagrammatically with reference to FIGS. 5a-5c is couched in terms of photographic systems having exposure control systems with a fixed aperture (f-number) for the primary camera lens and a fixed f-number (aperture) for any specific micro-lens in the micro-lens array 40 interposed between the primary camera lens and the photosensitive surface employed in the photographic system.

However, as noted above, camera 20 can have an exposure control system 24 with an aperture control system 28 that permits automatic or manual adjustment of the aperture (f-number). For example, aperture control system 28 can include a manual aperture adjustment, or the aperture control system can be electronically adjusted by the camera controller 62. As will be described more fully below, in such cameras, adjustment of the aperture has the effect of altering the effective latitude of the photosensitive element. Thus, where a user desires to capture an image of a scene having a very wide range of effective latitude, the f-number can be increased; alternatively, where a more narrow range of effective latitude is desired, the aperture f-number can be decreased. Accordingly, a variable aperture camera employing a primary lens and a micro-lens array to focus light at a light sensitive surface becomes a variable latitude camera system.

The reason for this is can be explained by recalling that, as described above, the idealized increase in photographic speed is given by Speed gain (in log relative Exposure) equals 2× log (camera lens f-number/micro-lens f-number). This idealized increase in speed can be reduced, for example, by adventitious or purposeful imperfections in the individual micro-lens or in the assembled micro-lens array that allows light ideally intended for concentration in a core area to practically be delivered to a surround area in a diluted quantity. It is this delivery of light to the surround areas in diluted quantity that can enable practical latitude increases. In this context, understanding the effect of employing a micro-lens array as a speed and latitude enhancing enabler in a camera having a variable f-number primary camera lens is both enlightening and leads to the assembly of photographic systems of great practical value for specific photographic situations as encountered with cameras employing either light sensitive silver halide or light sensitive solid-state photo sensors as a photosensitive surface on a photosensitive element.

Because the exposure per unit area at the photosensitive surface in the absence of the micro-lens array is given by $E_O$ and the efficiency of light concentration by the micro-lens is $\xi$, then in the presence of the micro-lens array, exposure per unit area in the core area ($E_c$) is equal to $E_O \times \xi \times$ the square of (camera lens f-number/micro-lens f-number). Here, $\xi$ can take a value of between zero and unity or alternative be expressed as an efficiency percent of between 0% to 100%. In a similar vein, the exposure per unit area in the surround area ($E_s$) is equal to $E_O \times (1-\xi)$. It follows that the log of the ratio of $E_s/E_c$ is a simple expression for the increase in latitude enabled by the composite photographic system as expressed in logarithmic terms. Substituting, log ($E_s/E_c$) is just the log of the ratio of $E_O \times (1-\xi)$ divided by $E_O \times \xi \times$ the square of (camera lens f-number/micro-lens f-number). Accordingly, the increase in latitude is log of the ratio of $(1-\xi)/(\xi \times$ the square of (camera lens f-number/micro-lens f-number), that is the increase in latitude depends on the optical characteristics of the primary camera lens and the micro-lens array and is independent of the actual exposure level $E_O$. Of course, in practical systems, lens flare associated with both the primary camera lens and the micro-lens array can be considered and will somewhat degrade the overall speed increase and the overall latitude increase predicted by these simple illustrative equations.

Accordingly, camera 20 having an exposure control system 24 with both a variable f-number lens system 22 and an array 40 of micro-lenses 42 is effectively a camera 20 where changing the f-number setting at the primary lens influences the latitude of the imaging system while maintaining the speed of the imaging system. This is distinct from a typical camera lacking micro-lens array 40 where changing the primary lens f-number, i.e. varying the lens aperture, changes the effective speed of the imaging system while maintaining the latitude. A variable f-number primary camera lens is most readily provided as a variable aperture lens as known in the art. It is specifically contemplated to employ a one-time-use camera having a primary lens, a light sensitive film, an interposed micro-lens array and a user operated slide carrying an aperture stop to provide a variable latitude camera. Such cameras can be especially useful by providing simple means to photography both indoor scenes (typically of short latitude) and outdoor scenes, typically of long latitude with the same system without needing to change the intrinsic characteristics of the photosensitive material itself. A camera having both a variable f-number primary camera lens and a micro-lens array can employ either light sensitive silver halide or light sensitive solid-state photo sensors as a photosensitive surface on a photosensitive element.

In the case of a variable latitude camera 20 employing a light sensitive silver halide, the micro-lens array can be provided as an intrinsic emulsion side array, an intrinsic support side array, an applied micro-bead array, or as a distinct micro-lens array mounted in camera 20, mounted to a film cartridge or cassette or otherwise supplied. When the micro-lens array 40 is distinct, it can be arranged to present the convex face or the flat face of the array to the photosensitive surface and can further employ a spacer 45 as described in the co-pending and commonly assigned patent applications already cited and incorporated by reference. In the case of a variable latitude camera 20 employing a photosensitive element comprising a light sensitive solid-state photo sensor, array 40 can be intrinsic to the construction of the photo sensor or distinct, as described in the co-pending and commonly assigned patent applications already cited incorporated by reference.

Figure 12:
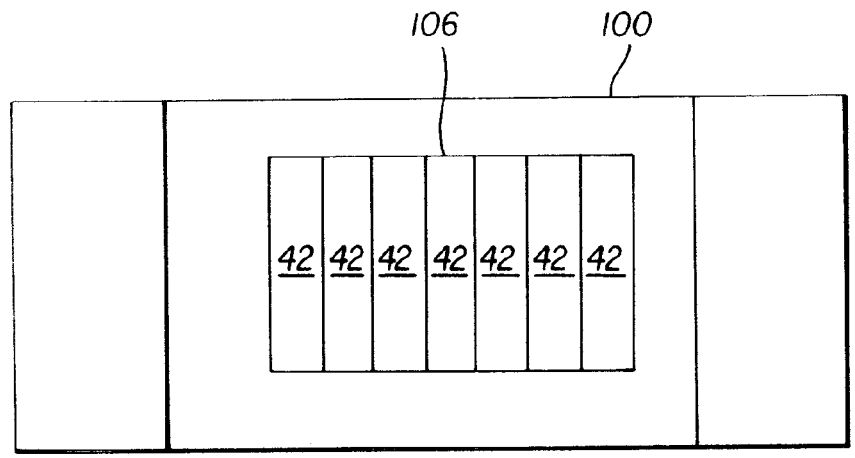
FIG. 12 illustrates an elevation view of a cassette system having an array of micro-lenses.
Figure 13:
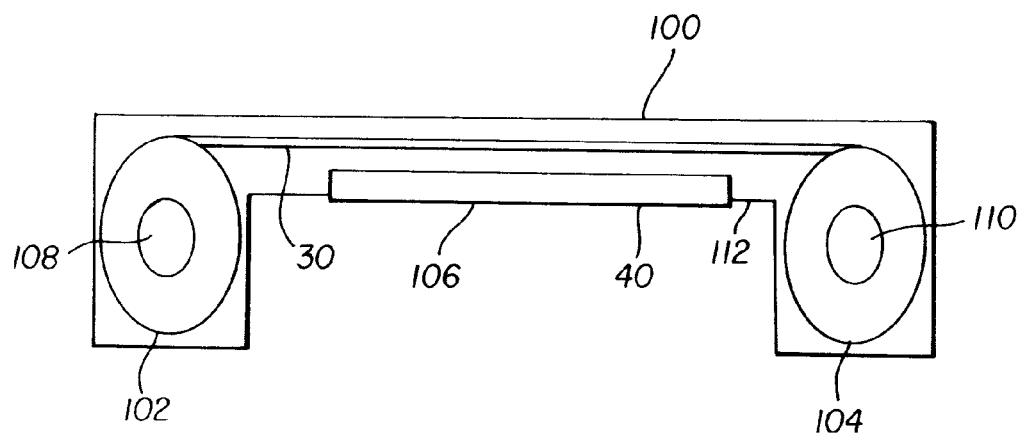
FIG. 13 illustrates a side view of the cassette system having an array of micro-lenses of FIG. 12.

In the above-described embodiments, cartridge system 10 has been shown as comprising a single housing 12 to which array 40 has been joined. However, in other embodiments, cartridge system 10 can take other forms. For example, FIGS. 12 and 13 show respectively a top view of a film cassette system 100 with supported micro-lens array 40 and a side view of the film cassette system 100 with supported micro-lens array 40 of FIG. 12 along b-b. Here the well known film spool 14 having a housing 12 that provides both a film supply area 102 and a film take up area 104 with a film exposure area 106 rigidly joining film supply area 102 and film take-up area 104. Film 30 is preloaded in film supply area 102, for example, on a film supply spool 108. A portion of film 30 is extended through the film exposure area 106 and onto a film take-up spool 110 in film take-up area 104.

Such cassette type systems are well known in the art and include but are not limited to the 110 format film system and in various professional camera systems. As can be seen in this embodiment, array 40 of micro-lens 42 is positioned confronting film 30 in exposure area 106. When light from a scene is directed toward exposure area 106, array 40 of micro-lens 42 fractures this light as described above. This embodiment, array 40 of micro-lenses 42 can be positioned directly onto walls 112 of exposure area 106 so as to enclose or partially enclose film 30 and to provide a preferred alignment of array 40 of micro-lenses 42 and film 30. Alternatively, array 40 of micro-lenses 42 can be joined to either or both film supply area 102 or film take up area 104.

Figure 14A:
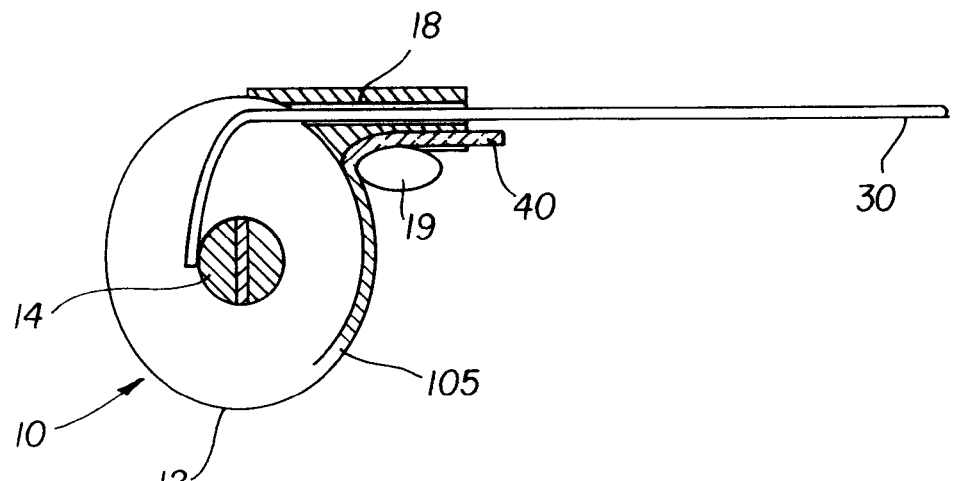
FIG. 14a illustrates a cross section of one embodiment of a cartridge having a positionable array of micro-lenses with the micro-lenses actively positioned in an exposure area.
Figure 14B:
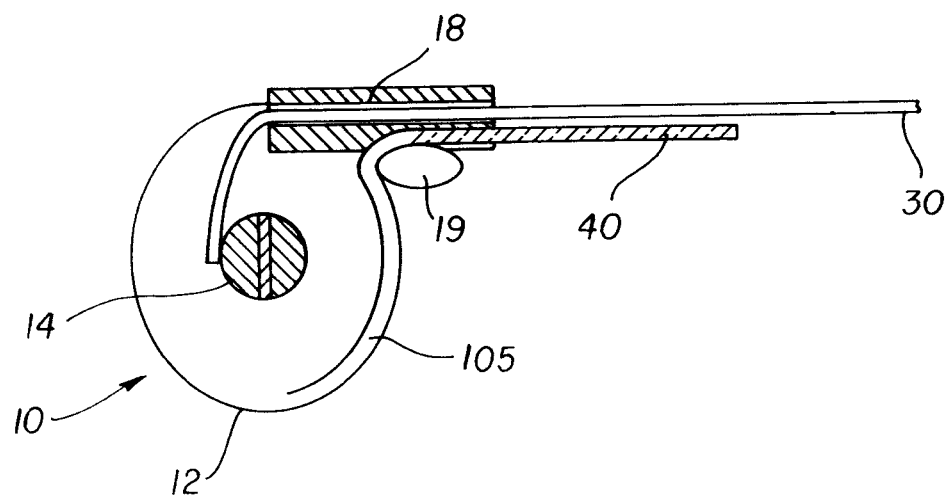
FIG. 14b illustrates a cross section of one embodiment of a cartridge having a positionable array of micro-lenses with the micro-lenses positioned in a storage area.

In yet another embodiment, a variable latitude camera 20 can be constructed by employing a distinct moveable micro-lens array 40 mounted so as to be optionally positioned in the light path between the primary camera lens and the photosensitive surface. FIGS. 14a and 14b illustrate a cartridge system 10 having a positionable array of micro-lenses 40. Here micro-lens array 40 can be supplied in a flexible form that can be extended from a storage area 105 (as shown in FIG. 14a) to the exposure area (As shown in FIG. 14b).

Figure 15A:
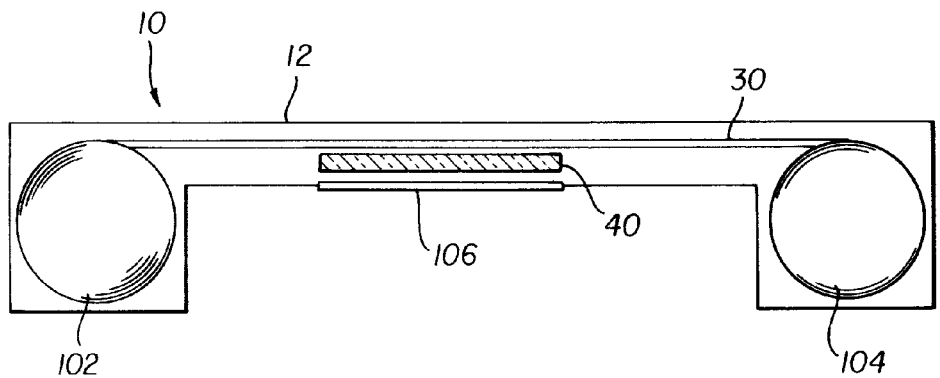
FIG. 15a illustrates a cassette having a positionable array of micro-lenses with the micro-lenses positioned in an exposure area.
Figure 15B:
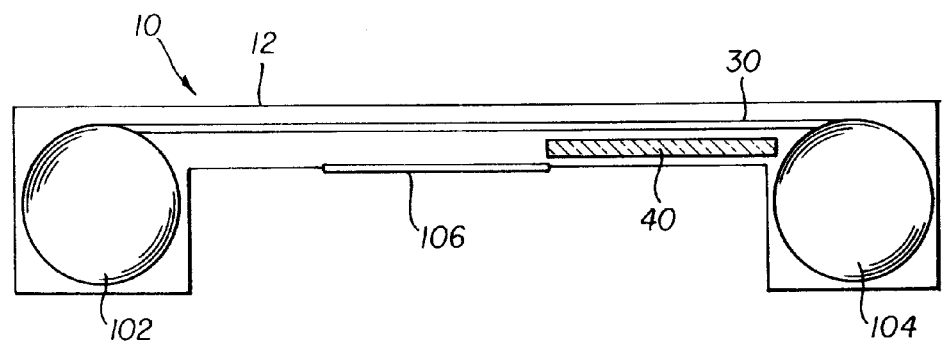
FIG. 15b illustrates the cassette of FIG. 15a with the positionable array of micro-lenses withdrawn from the exposure area.

FIGS. 15a and 15b illustrate an embodiment of a cartridge system 10 having a housing 12 in a cassette form. In this embodiment, a positionable array of micro-lenses 40 is mounted to the cartridge system 10 within housing 12 on user operable track (not shown). FIG. 15a shows the micro-lens array 40 positioned at the film exposure area 106 while FIG. 15b shows the micro-lens array 40 positioned away from the film exposure area 106.

FIGS. 16a, 16b, and 16c illustrate a camera system having a positionable array of micro-lenses. FIG. 16a illustrates a camera system 20 much like that shown earlier as FIG. 7 having a micro-lens 42 along with element contact surface 88 and plate assembly 89. Here the micro-lenses 42 along with element contact surface 88 and plate assembly 89 can be supplied as part of cartridge system 10, as part of a cassette or as an independent structure mounted in camera 20. FIG. 16b shows array 40 of micro-lenses 42 along with spacer 45 and plate assembly 89 focally withdrawn from optical interaction with film 30. As can be appreciated from the earlier discussion of micro-lens optics, the micro-lenses individually exhibit a short depth-of-focus relative to a typical camera lens system 22 so that even a small displacement of micro-lenses 42 along the optical axis OA can effectively remove micro-lenses 42 from active participation in light focusing while maintaining film 30 in an "in focus" condition relative to the depth-of-focus of the camera lens system 20.

FIG. 16c shows micro-lenses 42 along with spacer 45 and plate assembly 89 laterally withdrawn from optical interaction with film 30. Lateral withdrawal can be accomplished by a slide system mounted to camera body 20. Both lateral and focal withdrawal can be accomplished by pivoting (not shown) micro-lens array 40 to a generally out-of-focus position. It will be appreciated that any of the imaging systems employing distinct micro-lens arrays as detailed in the co-pending and commonly assigned U.S. Patent applications can be modified in this manner.

The invention has been described in detail with particular reference to certain preferred embodiments thereof, but it will be understood that variations and modifications can be effected within the spirit and scope of the invention.

PARTS LIST 10 cartridge system
12 housing
14 film spool
16 drive lug
18 aperture
19 mounting
20 camera
22 lens system
24 exposure control system
25 gate
26 shuttering system
28 aperture setting system
30 film
31 film supply area
32 photosensitive surface
33 film receiving area
34 base portion
35 leader end
36 perforations 37 winding spool
38 film winding system
39 film rewinding system
40 array
41 light receiving surface
42 micro-lens
43 light focusing surface
44 concentrated fraction
45 spacer
46 residual fraction
47 expected image areas
48 concentrated image area
49 intersection
50 residual image area
51 light ray
52 concentrated image element
53 light ray
54 residual image
55 plane corresponding to the projected area of one micro-lens
60 light sensor
62 controller
63 lens adjustment system
64 read head
65 communication system
66 write head
67 array detector
68 artificial illumination
70 scene luminance range
72 actual latitude of photosensitive element
74 lower response threshold
76 upper response threshold
78 latitude desired for photographic element
80 lower response threshold of desired latitude
82 upper response threshold of desired latitude
84 first exposure range
86 second exposure range
88 element contact surface
89 pressure plate assembly
90 support
102 film supply area
104 film take-up area
106 exposure area
108 film supply spool
110 film take up spool
112 walls
E exposure area
I image
S scene
OA Optical Axis

What is claimed is:

1. A cartridge for use in a camera, the cartridge comprising:
   a photosensitive element having an exposure surface;
   a housing having a storage area for storing the photosensitive element and an opening adapted to permit transport of the photosensitive element from a storage position within the housing to an exposure position outside of the housing; and,
   a micro-lens array joined to the housing and positioned to confront the exposure surface when the photosensitive element is in the exposure position.

2. The cartridge of claim 1, wherein the micro-lens array is elastically deflectable.

3. The cartridge of claim 1, wherein the micro-lens array is sufficiently flexible to adapt to the shape of a non-planar exposure area in the camera.

4. The cartridge of claim 1, wherein the housing further comprises an array storage area having an array opening for retaining said micro-lens array and an array opening adapted to permit transport of the micro-lens array from an interior position within the array storage area to the position that confronts when the photosensitive element is moved to the exposure position.

5. The cartridge of claim 4, wherein the housing further comprises a photosensitive element contact surface that moves the photosensitive element from the interior position to the position that confronts the exposure surface in response to movement of the photosensitive element from the storage position to the exposure position.

6. The cartridge of claim 4, wherein the housing further contains a drive member adapted to engage a drive system on the camera and having a thrust system that moves the micro-lens array from the interior position to the position that confronts the exposure surface.

7. The cartridge of claim 1, wherein the micro-lens array comprises a substantially rigid form.

8. The cartridge of claim 1, wherein the micro-lens array is formed from a substantially rigid non-planar form.

9. The cartridge of claim 1, wherein the micro-lens array comprises an array of micro-lenses with each micro-lens in the array having a light receiving surface adapted to receive light from the primary lens and a light focusing surface confronting a photosensitive element, with the light focusing surface adapted to concentrate the received light onto the photosensitive element.

10. The cartridge of claim 1, wherein the micro-lens array comprises an array of micro-lenses with each micro-lens in the array having a light receiving surface adapted to receive light from the primary lens and to concentrate the received light onto the photosensitive element.

11. The cartridge of claim 1, wherein the cartridge comprises a supply chamber, an exposure chamber and a receiving chamber.

12. The cartridge of claim 11, wherein the cartridge is adapted for use in a camera that exposes a photosensitive element located in the exposure chamber to light from a scene during an exposure and wherein the array of micro-lenses is joined to the housing so that the array of micro-lenses is positioned between the scene and the photosensitive element when the film is in the exposure chamber.

13. The cartridge of claim 1, wherein said cartridge is in cassette form.

14. A cartridge for use in a camera, the cartridge comprising:
   a housing having a photosensitive element with an exposure surface and an opening adapted to permit transport of the photosensitive element from a storage position within the housing to an exposure position outside of the housing; and,
   a micro-lens array joined to the housing and positioned to confront the exposure surface when the photosensitive element is in the exposure position;
   wherein each micro-lens is positioned to receive focused light from a scene and adapted to fracture the received light into a first fraction and a second fraction with the first fraction concentrated to form a first image on a first portion of the photosensitive element when the light received during an exposure is within a first range, with said second fraction passing onto the photosensitive element to form a second image on a second portion of the photosensitive element when the light received during an exposure is within a second range.

15. The cartridge of claim 14, wherein the micro-lens array includes micro-lenses having an f-number of 1.5 to 16.

16. The cartridge of claim 14, wherein the micro-lens array includes micro-lenses having an aperture of 3 to 100 microns.

17. The cartridge of claim 14, wherein said cartridge is in cassette form.

18. A camera system comprising:
a camera body having a chamber adapted to receive a cartridge;
a lens system to focus light from a scene toward an exposure area inside the camera body; and
an exposure control system for controllably allowing light to pass from the lens system to the exposure area to define an exposure;
said cartridge having a housing with an opening adapted to permit transport of a photosensitive element from a storage position within the housing to the exposure area; and a micro-lens array joined to the housing and positioned to confront the photosensitive element when the photosensitive element is in the exposure area with each micro-lens adapted to receive light from the lens system, and to concentrate a first fraction of the received light a first image on a first portion of the photosensitive element when the amount of light received from the lens system during exposure is within a first range, with a second fraction of the received light passing onto the photosensitive element to form a second image on a second portion of the photosensitive element when the amount of light received from the lens system during exposure is within a second range.

19. The camera system of claim 18, further comprising a controller to determine an effective latitude of the photosensitive element and to adjust operation of the exposure control system to capture an image on at least one of the first portion or second portion of the photosensitive element.

20. The camera system of claim 18, wherein the exposure control system comprises a shutter system.

21. The camera system of claim 18, wherein the exposure control system comprises an adjustable aperture control system.

22. The camera system of claim 19, wherein the controller is adapted to adjust operation of the exposure control system based upon at least one of the determined first and second ranges.

23. The camera system of claim 21, wherein the controller determines an effective latitude of the photosensitive element based in part on the aperture size.

24. The camera system of claim 19, further comprising a gate that is adjustable between a setting for holding a photosensitive element to receive light from the lens system and a position for holding a photosensitive element and a micro-lens array to receive light from the lens system.

25. The camera system of claim 19, wherein the controller is also adapted to receive signals from a sensor that is adapted to detect whether a cartridge that has a micro-lens array, and the controller is operable in a first mode when a cartridge having a micro-lens array is detected and is also operable in a second mode when a cartridge that does not have a micro-lens is detected.

26. The camera system of claim 25, wherein the controller operates the exposure control differently in each mode.

27. The cartridge of claim 18, wherein said cartridge is in cassette form.

* * * * *

UNITED STATES PATENT AND TRADEMARK OFFICE
CERTIFICATE OF CORRECTION

PATENT NO. : 7,310,477 B2 Page 1 of 1
APPLICATION NO. : 10/649464
DATED : December 18, 2007
INVENTOR(S) : Richard P. Szajewski et al.

It is certified that error appears in the above-identified patent and that said Letters Patent is hereby corrected as shown below:

Title Page, Column 2 item 57 (Abstract)   After "joined" insert -- to --, therefor.

Signed and Sealed this

Twentieth Day of May, 2008

JON W. DUDAS
*Director of the United States Patent and Trademark Office*